(12) United States Patent
Izawa et al.

(10) Patent No.: US 10,025,668 B2
(45) Date of Patent: Jul. 17, 2018

(54) SEMICONDUCTOR DEVICE AND CONTROL METHOD THEREOF FOR PROCESSING

(71) Applicant: Renesas Electronics Corporation, Tokyo (JP)

(72) Inventors: Yoshitaka Izawa, Tokyo (JP); Katsumi Togawa, Tokyo (JP); Takao Toi, Tokyo (JP); Taro Fujii, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 139 days.

(21) Appl. No.: 15/141,687

(22) Filed: Apr. 28, 2016

(65) Prior Publication Data

US 2016/0371147 A1    Dec. 22, 2016

(30) Foreign Application Priority Data

Jun. 19, 2015 (JP) ................................. 2015-123432

(51) Int. Cl.
| | |
|---|---|
| *G06F 11/00* | (2006.01) |
| *G06F 11/14* | (2006.01) |
| *G06F 11/20* | (2006.01) |

(52) U.S. Cl.
CPC ............ *G06F 11/142* (2013.01); *G06F 11/00* (2013.01); *G06F 11/20* (2013.01); *G06F 11/202* (2013.01); *G06F 2201/805* (2013.01); *G06F 2201/85* (2013.01)

(58) Field of Classification Search
CPC ............ G06F 11/142; G06F 2201/805; G06F 2201/85; G06F 11/20; G06F 11/202; G06F 11/2236; H03K 19/00; H03K 19/003

See application file for complete search history.

(56) References Cited

U.S. PATENT DOCUMENTS

| | | | | |
|---|---|---|---|---|
| 3,828,321 A | * | 8/1974 | Wilber ................... | G06F 11/20 714/10 |
| 4,141,066 A | * | 2/1979 | Keiles ...................... | G05B 9/03 700/81 |
| 4,684,885 A | * | 8/1987 | Chapman ................ | G06F 11/22 714/735 |

(Continued)

FOREIGN PATENT DOCUMENTS

JP       2009-542098 A    11/2009

*Primary Examiner* — Bryce P Bonzo
*Assistant Examiner* — Jonathan D Gibson
(74) *Attorney, Agent, or Firm* — McGinn IP Law Group, PLLC

(57) ABSTRACT

According to an embodiment, a reconfigurable device 1 includes a configuration information storage memory 12, a state transition management unit 11, and a data path unit 13. When a failure is not detected in either of tiles T1 and T2 provided in the data path unit 13, the state transition management unit 11 selects the configuration information item so that a first processing circuit is configured using the tiles T1 and T2, while when a failure is detected in the tile T2, the state transition management unit 11 selects the configuration information item so that after a first intermediate processing circuit is configured using the tile T1 in which no failure is detected, a second intermediate processing circuit is configured again using the tile T1 in order to achieve the first processing circuit.

20 Claims, 24 Drawing Sheets

(56) References Cited

U.S. PATENT DOCUMENTS

| | | | | |
|---|---|---|---|---|
| 4,823,256 A | * | 4/1989 | Bishop | G06F 11/1666 700/82 |
| 5,202,980 A | * | 4/1993 | Morita | G06F 11/2038 714/11 |
| 5,655,069 A | * | 8/1997 | Ogawara | G06F 11/20 714/10 |
| 5,841,775 A | * | 11/1998 | Huang | H04L 45/00 370/388 |
| 7,427,871 B2 | | 9/2008 | Kelem et al. | |
| 7,535,255 B2 | * | 5/2009 | Aida | G06F 11/1428 326/101 |
| 7,609,083 B2 | * | 10/2009 | Fuseya | G06F 11/142 326/10 |
| 7,987,398 B2 | * | 7/2011 | Kitaoka | G06F 15/7867 326/39 |
| 8,058,897 B1 | * | 11/2011 | Lu | G06F 17/5054 326/101 |
| 8,204,980 B1 | * | 6/2012 | Sandstrom | G06F 11/0727 709/224 |
| 8,812,905 B2 | * | 8/2014 | Sutardja | G01R 31/318536 714/10 |
| 9,639,653 B2 | * | 5/2017 | Frischke | G06F 17/5081 |
| 2014/0095928 A1 | * | 4/2014 | Ogasawara | G06F 11/0721 714/15 |

* cited by examiner

SEMICONDUCTOR DEVICE AND CONTROL METHOD THEREOF FOR PROCESSING

CROSS-REFERENCE TO RELATED APPLICATIONS

This application is based upon and claims the benefit of priority from Japanese patent application No. 2015-123432, filed on Jun. 19, 2015, the disclosure of which is incorporated herein in its entirety by reference.

BACKGROUND

The present invention relates to a semiconductor device and a control method thereof, and to, for example, a semiconductor device and a control method thereof that are suitable for executing desired processing without skipping low-priority processing.

Published Japanese Translation of PCT International Publication for Patent Application, No. 2009-542098 discloses an element controller for a resilient integrated circuit architecture. This integrated circuit includes a plurality of composite circuit elements, a state machine element (SME), and a plurality of communication elements. Each composite circuit element includes a selected circuit element which may vary by element interface and element type, and which may be configurable. The state machine element assigns various functions based on an element type, such as assigning a first configuration to a first element type, assigning a second configuration to a second element type, and providing a first data link for the corresponding assignments. In response to detection of a fault or failure, the state machine element reassigns the first configuration to another composite circuit element and creates a second data link for continuing the same functioning. Function assignment, routing, fault detection, and re-assignment and data re-routing can occur in real time for a wide variety of programs and algorithms, providing for the integrated circuit to continue the same functioning despite defects which may arise during operation.

SUMMARY

However, with the configuration disclosed in Published Japanese Translation of PCT International Publication for Patent Application, No. 2009-542098, when a failure is detected in any one of the composite circuit elements, although high priority processing can be executed using other composite circuit elements in which no failure is detected, low-priority processing needs to be excluded. Therefore, the present inventor has found a problem that with the configuration disclosed in Published Japanese Translation of PCT International Publication for Patent Application, No. 2009-542098, desired processing cannot be executed. Other problems of the related art and new features of the present invention will become apparent from the following descriptions of the specification and attached drawings.

In an aspect of the present invention, in a semiconductor device, when a failure is not detected in any one of a plurality of logic circuit groups provided in a data path unit, a state transition management unit selects a configuration information item so that a first processing circuit is configured using some or all of the plurality of logic circuit groups, and when a failure is detected in any one of the plurality of logic circuit groups, the state transition management unit selects the configuration information item so that a first intermediate processing circuit is configured using some or all of logical circuit groups in which no failure is detected from among the plurality of logic circuit groups, and then a second intermediate processing circuit is configured using some or all of the logical circuit groups in which no failure is detected from among the plurality of logic circuit groups, in order to achieve the first processing circuit.

In another aspect of the present invention, in a semiconductor device, when a failure is not detected in any one of a plurality of logic circuits provided in a data path unit, a state transition management unit selects a configuration information item so that a first processing circuit is configured using some of the plurality of logic circuits, and when a failure is detected in any one of the plurality of logic circuit, the state transition management unit selects the configuration information item so that a plurality of the first processing circuits are configured using some or all of the plurality of logical circuits, and a result of processing by the first processing circuit is determined according to results of processing by the plurality of respective first processing circuits.

In another aspect of the present invention, a control method of a semiconductor device includes: selecting, when a failure is not detected in any one of a plurality of logic circuit groups provided in the data path unit, a configuration information item so that a first processing circuit is configured using some or all of the plurality of logic circuit groups; and selecting, when a failure is detected in any one of the plurality of logic circuit groups, the configuration information item so that a first intermediate processing circuit is configured using some or all of logic circuit groups in which no failure is detected from among the plurality of logic circuit groups, and then a second intermediate processing circuit is configured using some or all of the logic circuit groups in which no failure is detected from among the plurality of logic circuit groups, in order to achieve the first processing circuit.

In another aspect of the present invention, a control method of a semiconductor device includes: selecting, when a failure is not detected in any one of a plurality of logic circuits provided in a data path unit, a configuration information item so that a first processing circuit is configured using some of the plurality of logic circuits; selecting, when a failure is detected in any one of the plurality of logic circuits, the configuration information item so that a plurality of the first processing circuits are configured using some or all of the plurality of logic circuits; and determining a result of processing by the first processing circuit according to results of processing by the plurality of respective first processing circuits.

According to the above aspects, it is possible to provide a semiconductor device and a control method thereof that can execute desired processing without skipping low-priority processing even when a failure is detected.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Hereinafter, embodiments will be described with reference to the drawings. The drawings are in a simplified form, and the technical scope of the embodiments should not be interpreted to be limited to the drawings. The same elements are denoted by the same reference signs, and repeated descriptions are omitted.

The invention will be described by dividing it into a plurality of sections or embodiments whenever circumstances require it for convenience in the following embodiments. However, unless otherwise particularly specified, these sections or embodiments are not irrelevant to one another. One section or embodiment is related to modifications, applications, details, supplementary explanations, and the like of some or all of the other ones. When reference is made to the number of elements or the like (including the number of pieces, numerical values, quantity, range, etc.) in the following embodiments, the number thereof is not limited to a specific number and may be greater than or less than or equal to the specific number unless otherwise particularly specified and definitely limited to the specific number in principle.

Further, in the following embodiments, components (including operation steps, etc.) are not always essential unless otherwise particularly specified and considered to be definitely essential in principle. Similarly, when reference is made to the shapes, positional relations, and the like of the components or the like in the following embodiments, they will include ones, for example, substantially approximate or similar in their shapes or the like unless otherwise particularly specified and considered not to be definitely so in principle. This is similarly applied even to the above-described number or the like (including the number of pieces, numerical values, quantity, range, etc.).

First Embodiment

Figure 1:
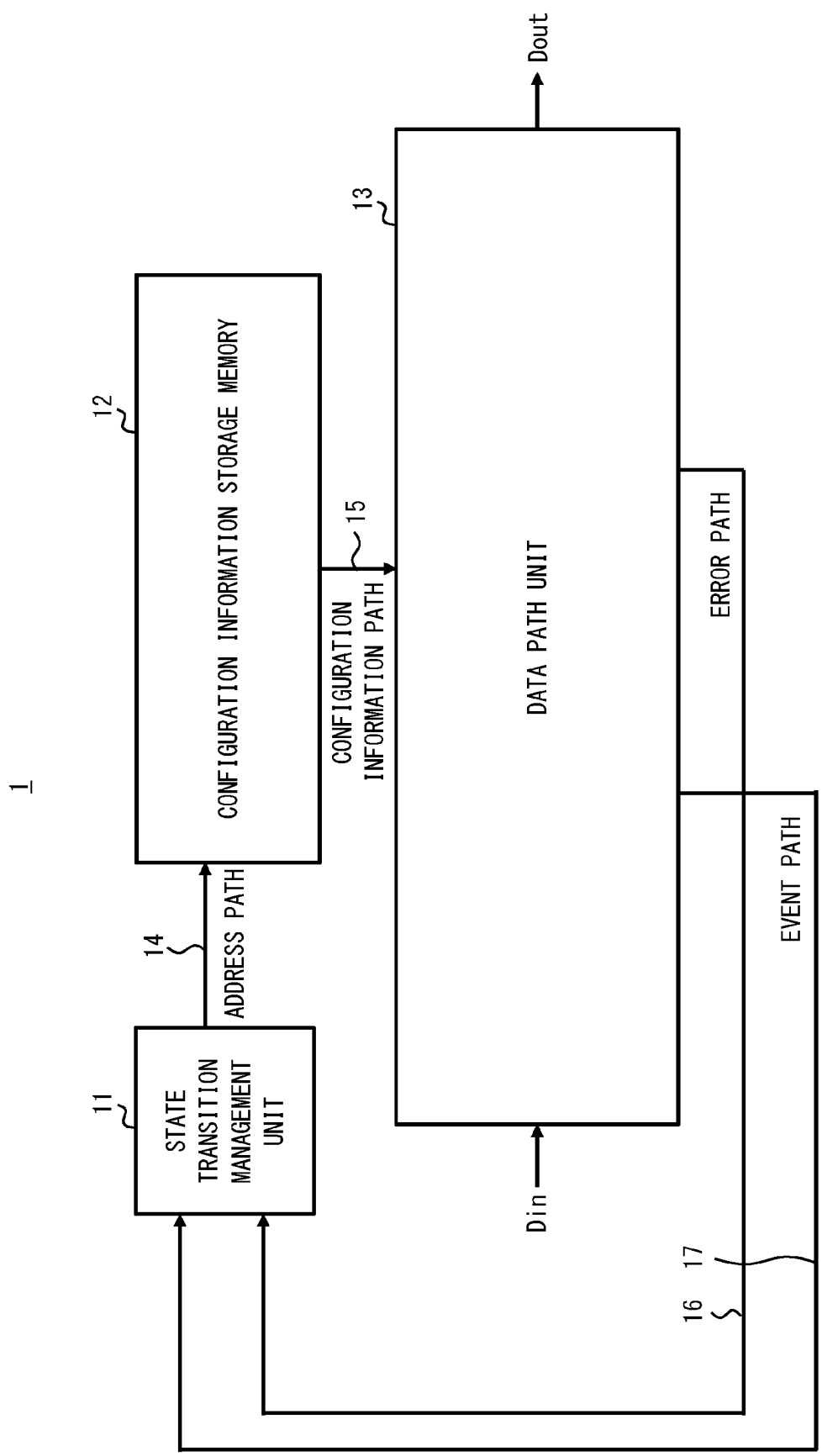
FIG. 1 is a block diagram showing a configuration example of a reconfigurable device according to a first embodiment.

FIG. 1 is a block diagram showing a configuration example of a reconfigurable device (a semiconductor device) 1 according to a first embodiment. In the reconfigurable device 1 according to this embodiment, when a failure is detected in any one of a plurality of logic circuit groups provided in a dynamically reconfigurable data path unit, a first intermediate processing circuit is configured using a logic circuit group in which no failure is detected, and then a second intermediate processing circuit is configured again using the logic circuit group in which no failure is detected, in order to achieve a desired first processing circuit. Thus, the reconfigurable device 1 according to this embodiment can execute desired processing without skipping low-priority processing even when a failure is detected. Hereinafter, the reconfigurable device 1 will be described in detail.

As shown in FIG. 1, the reconfigurable device 1 includes a state transition management unit 11, a configuration information storage memory 12, and a data path unit 13. Further, an error path 16 and an event path 17 are provided between the data path unit 13 and the state transition management unit 11. An address path 14 is provided between the state transition management unit 11 and the configuration information storage memory 12. A configuration information path 15 is provided between the configuration information storage memory 12 and the data path unit 13.

The data path unit 13 is a data processing unit that can dynamically reconfigure a circuit(s) according to a configuration information item(s) supplied from outside, performs processing using the reconfigured circuit on input data Din, and outputs obtained output data Dout.

Further, the data path unit 13 activates a process completion signal (e.g., switches the process completion signal from an L level to an H level) when the process is completed, and activates a failure detection signal (e.g., switches the failure detection signal from an L level to an H level) when a failure is detected. Note that a failure in the data path unit 13 may be detected by performing a test such as a scan test or may be detected in real time by a parity bit or the like.

The process completion signal output from the data path unit 13 is supplied to the state transition management unit 11 through the event path 17. The failure detection signal output from the data path unit 13 is supplied to the state transition management unit 11 through the error path 16.

The state transition management unit 11 selects a configuration information item to be output to the data path unit 13 from among a plurality of configuration information items stored in the configuration information storage memory 12. For example, the state transition management unit 11 selects any one of the configuration information items stored in the configuration information storage memory 12 according to the process completion signal and the failure detection signal from the data path unit 13.

More specifically, the state transition management unit 11 outputs an address signal corresponding to the process completion signal and the failure detection signal from the data path unit 13. This address signal is supplied to the configuration information storage memory 12 through the address path 14. The configuration information item stored in a storage region at an address specified by the address signal is read out from the configuration information storage memory 12.

Note that the configuration information storage memory 12 stores at least one or a plurality of configuration information items that are selected when a failure is not detected in the data path unit 13 (hereinafter referred to as a normal mode) and a plurality of configuration information items that are selected when a failure is detected in the data path unit 13 (hereinafter referred to as a safe mode).

The configuration information item read out from the configuration information storage memory 12 (i.e., the configuration information item selected by the state transition management unit 11) is supplied to the data path unit 13 through the configuration information path 15. Next, the data path unit 13 dynamically reconfigures a circuit according to the configuration information item supplied from the configuration information storage memory 12, performs processing on the input data Din using the reconfigured circuit, and outputs the obtained output data Dout.

(Specific Configuration Example of the Data Path Unit 13)

Figure 2:
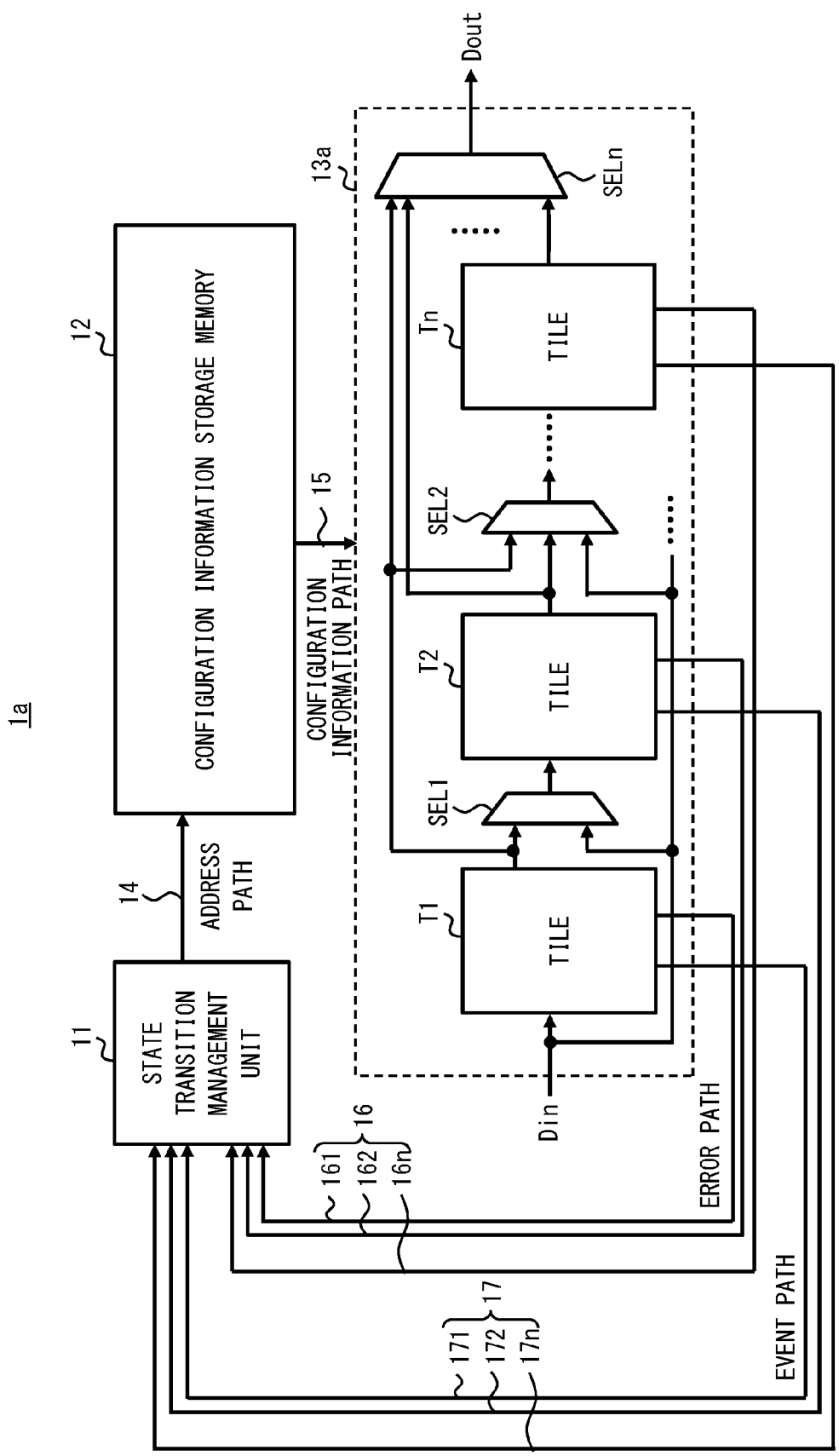
FIG. 2 is a block diagram showing a specific configuration example of the reconfigurable device shown in FIG. 1.

FIG. 2 is a block diagram showing a reconfigurable device 1a which is a specific configuration example of the reconfigurable device 1. In FIG. 2, a specific configuration example of the data path unit 13 is a data path unit 13a.

As shown in FIG. 2, the data path unit 13a includes tiles T1 to Tn (n is an integer greater than or equal to two) and selectors SEL1 to SELn.

Each of the tiles T1 to Tn includes a logic circuit group.

Figure 3:
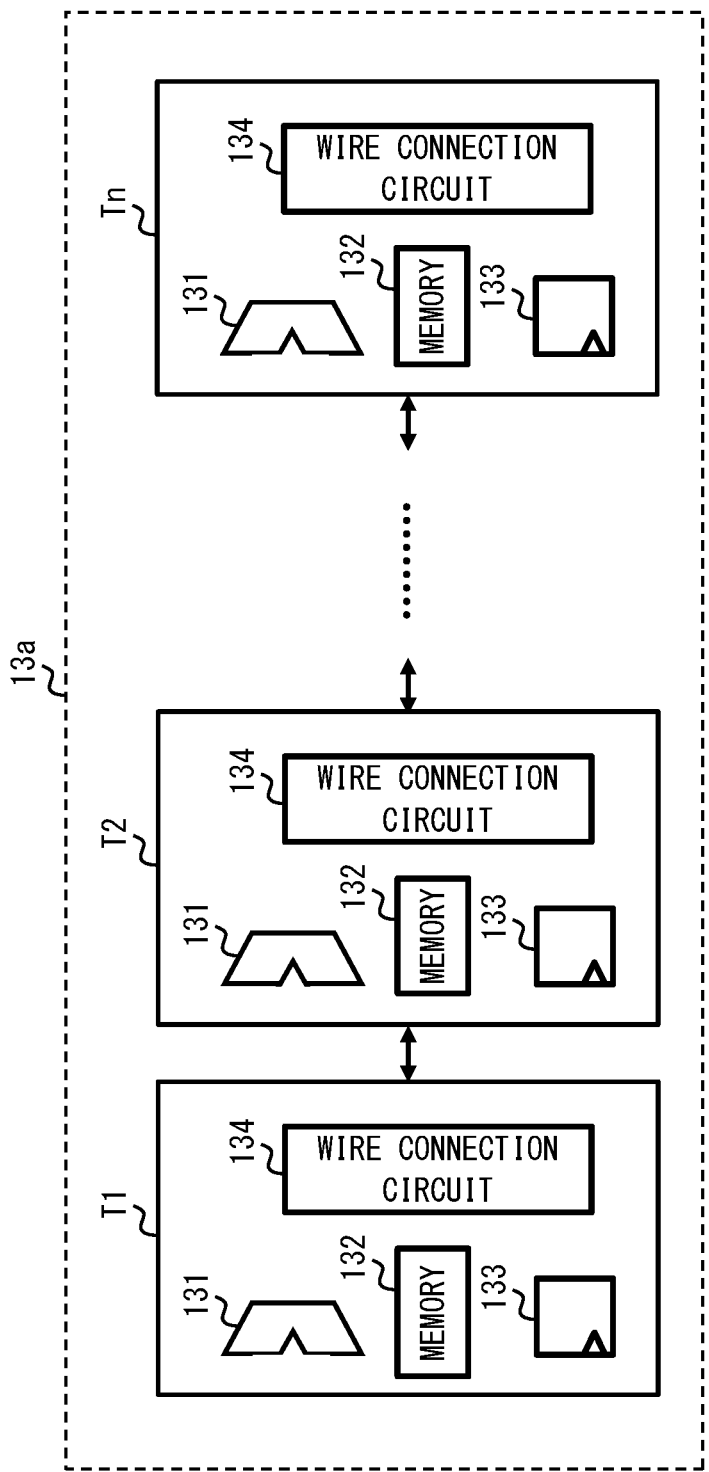
FIG. 3 is a block diagram showing a configuration example of a data path unit provided in the reconfigurable device shown in FIG. 1.

Referring to FIG. 3, each of the tiles T1 to Tn includes, for example, an operator 131, a memory 132, a register 133, and a wire connection circuit 134, and processing performed by the operator 131, wire connection performed by the wire connection circuit 134, data initial values and the like are determined according to the configuration information items from outside. Note that a configuration of each of the tiles T1 to Tn is not limited to a configuration including all of the operator 131, the memory 132, the register 133, and the wire connection circuit 134, and a configuration including some of them or a configuration including a plurality of sets of some or all of them may be incorporated.

The tile T1 performs the processing on the input data Din and output obtained data. The tiles T2 to Tn perform the processing on outputs of selectors SEL1 to SEL(n−1), respectively, and outputs obtained data. The tiles T1 to Tn activate process completion signals EVF1 to EVFn, respectively, when they complete processing, and activate failure detection signals ERF1 to ERFn when a failure is detected.

The process completion signals EVF1 to EVFn that are output from the tiles T1 to Tn are supplied to the state transition management unit 11 through event paths 171 to 17n, respectively, that constitute the event path 17. Moreover, the failure detection signals ERF1 to ERFn output from the tiles T1 to Tn are supplied to the state transition management unit 11 through error paths 161 to 16n, respectively, that constitute the error path 16.

Each of the selectors SEL1 to SELn selects any one of all outputs of the tiles in the previous stage(s) and the input data Din according to the configuration information item from outside. More specifically, the selector SELi (i is any one of 1 to n) selects and outputs any one of the output(s) of the tiles T1 to Ti (when i=1, only the output of the tile T1) in the previous stage(s) and the input data Din according to the configuration information item from outside. The output of the selector SELn is output outside as the output data Dout of the data path unit 13a.

(Operation of Reconfigurable Device 1a Having Two Tiles)

Figure 4:
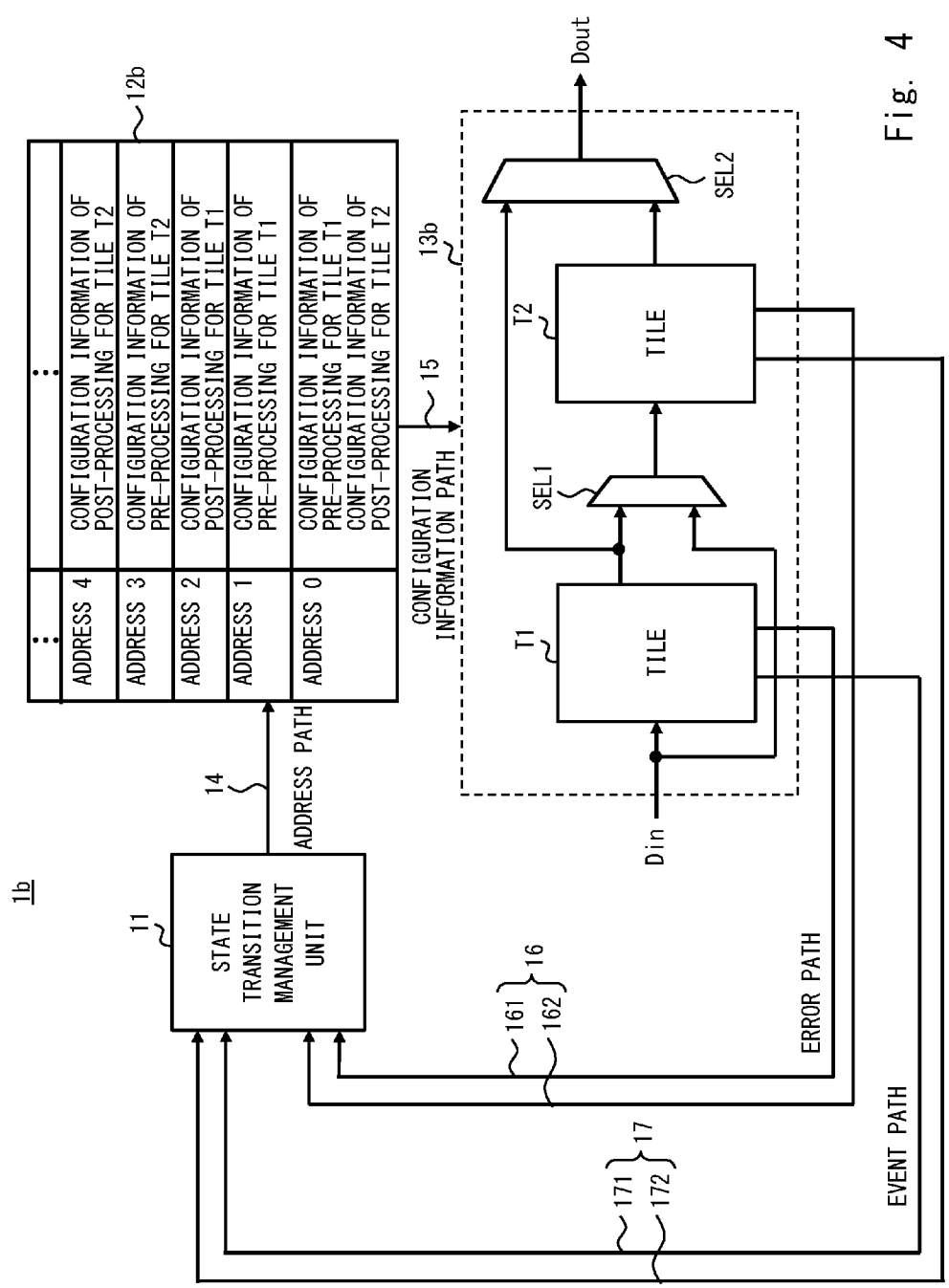
FIG. 4 is a block diagram showing a configuration example when there are two tiles in the reconfigurable device shown in FIG. 2.

FIG. 4 is a block diagram showing a reconfigurable device 1b which is the reconfigurable device 1a having two tiles (n=2).

As shown in FIG. 4, the reconfigurable device 1b includes a configuration information storage memory 12b as the configuration information storage memory 12 and a data path unit 13b as the data path unit 13.

In the configuration information storage memory 12b, for example, a configuration information item in the normal mode is stored in a storage region at an address 0, configuration information items of pre-processing and post-processing in a first safe mode are stored in storage regions at addresses 1 and 2, respectively, and configuration information items of pre-processing and post-processing in a second safe mode are stored in storage regions at addresses 3 and 4, respectively.

The data path unit 13b includes two tiles T1 and T2 and selectors SEL1 and SEL2.

Figure 5:
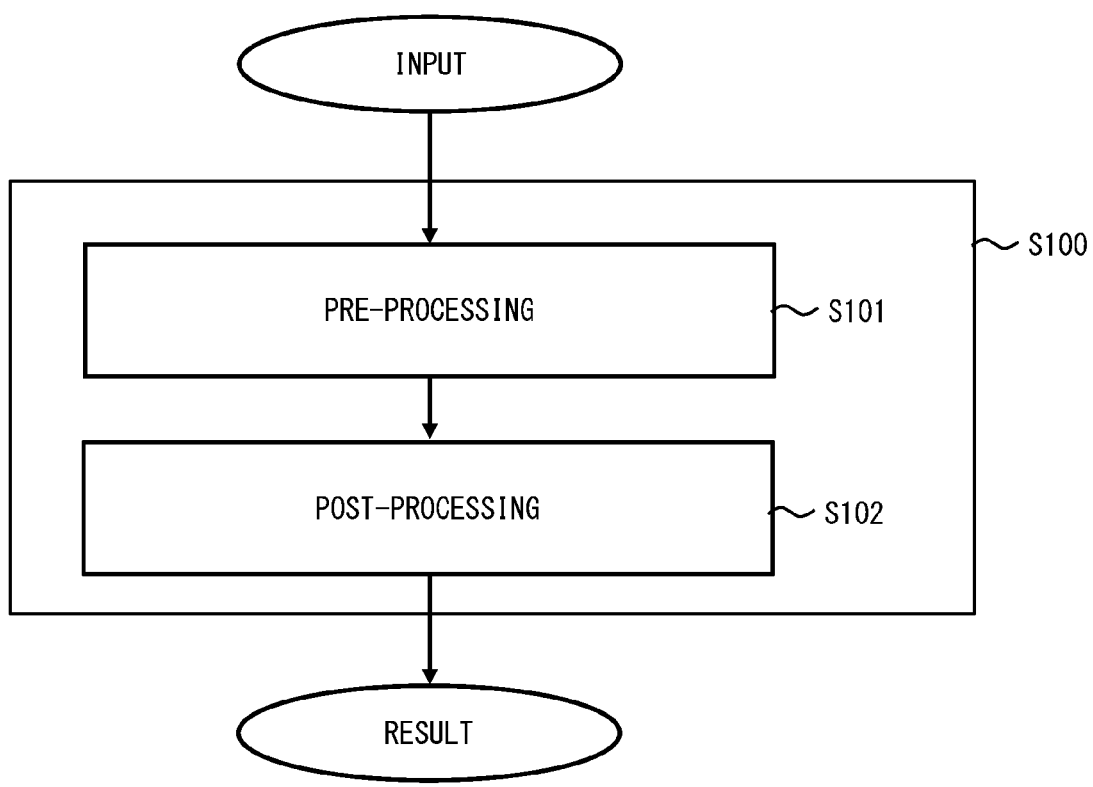
FIG. 5 is a flowchart showing an operation of the reconfigurable device shown in FIG. 4.

FIG. 5 is a flowchart showing an operation of the reconfigurable device 1b.

In an example of FIG. 5, the reconfigurable device 1b performs the pre-processing on the input data Din (step S101), performs the post-processing on the input data Din (step S102), and then consequently, executes desired processing on the input data Din (step S100).

Figure 6:
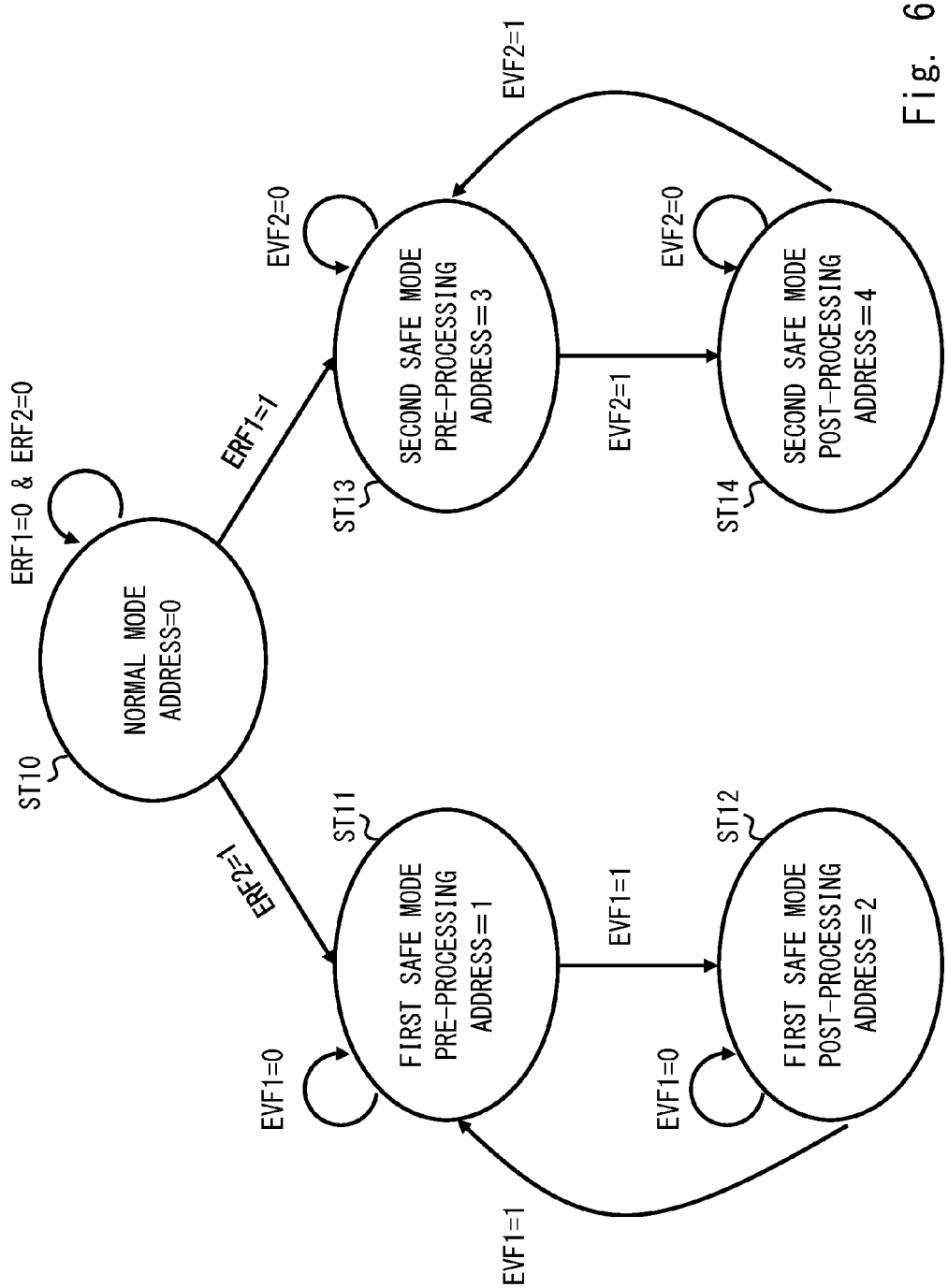
FIG. 6 is a state transition diagram of the reconfigurable device shown in FIG. 4.

FIG. 6 is a state transition diagram of the reconfigurable device 1b. Details of the state transition diagram will be described later together with a description of an operation of the reconfigurable device 1b.

(Operation in Normal Mode)

Figure 7:
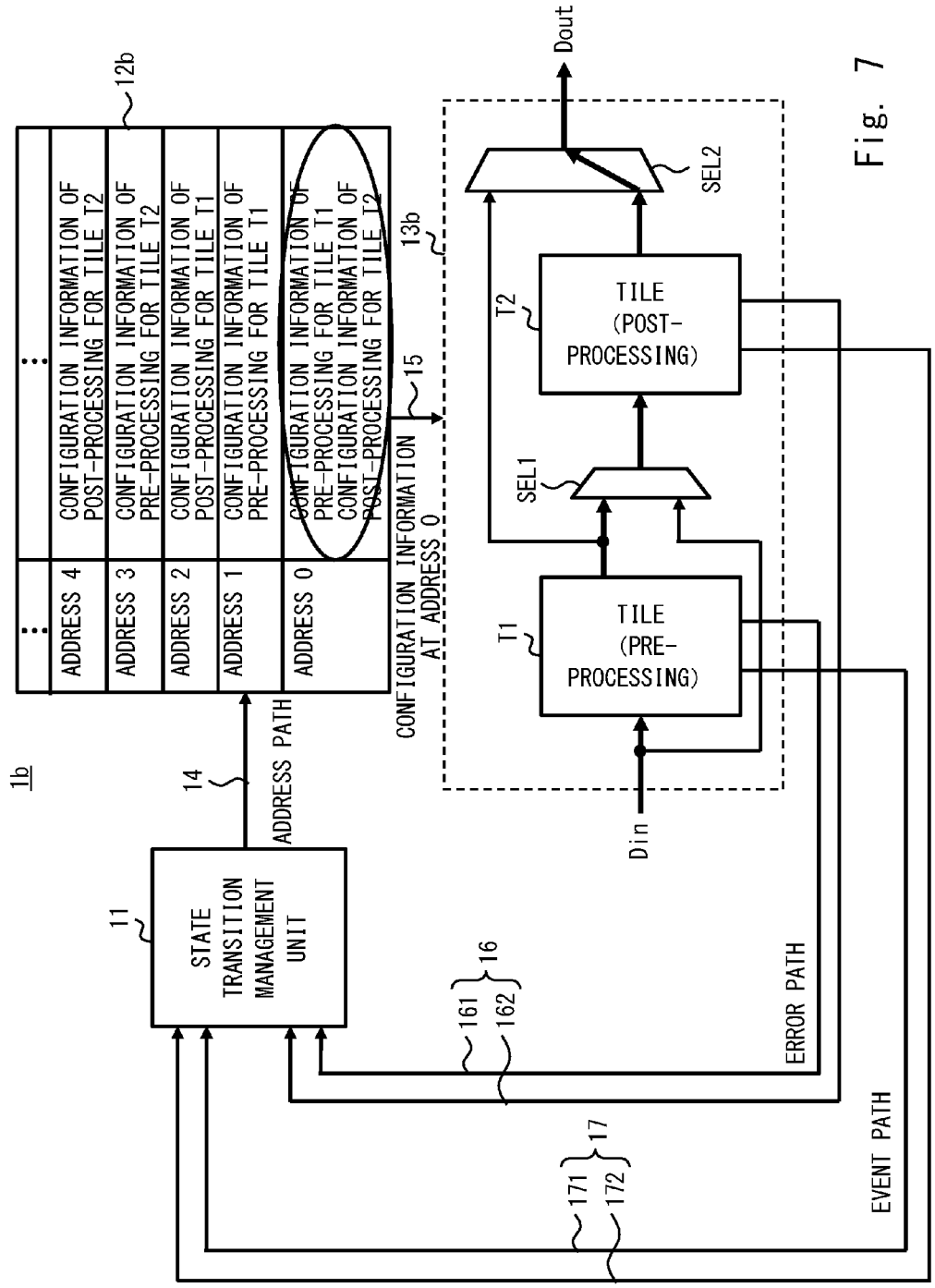
FIG. 7 is a block diagram for explaining an operation in a normal mode of the reconfigurable device shown in FIG. 4.

Firstly, an operation in the normal mode of the reconfigurable device 1b will be described. FIG. 7 is a block diagram for explaining the operation in the normal mode of the reconfigurable device 1b.

As shown in FIG. 7, when no failure is detected in the data path unit 13b, that is, when both of the failure detection signals ERF1 and ERF2 output from the tiles T1 and T2 are inactive, the state transition management unit 11 outputs the address signal indicating an address 0 (ST10 in FIG. 6). Next, the configuration information item stored in the storage region at the address 0 is read out from the configuration information storage memory 12b and then supplied to the data path unit 13b. Thus, a first intermediate processing circuit that executes the pre-processing is configured by the tile T1, and a second intermediate processing circuit that executes the post-processing is configured by the tile T2. Moreover, the selector SEL1 is configured to select and output an output result of the tile T1, and the selector SEL2 is configured to select and output an output result of the tile T2. As a result, in the data path unit 13b, processing can be executed by a desired processing circuit.

In this state, the input data Din is supplied to the data path unit 13b. The first intermediate processing circuit configured using the tile T1 performs the pre-processing on the input data Din. After that, the second intermediate processing circuit configured using the tile T2 performs the post-processing on the output result of the tile T1. Then, the output result of the tile T2 is output outside as the output data Dout of the data path unit 13b. In this way, in the data path unit 13b, a process is executed by a desired processing circuit.

Figure 8:
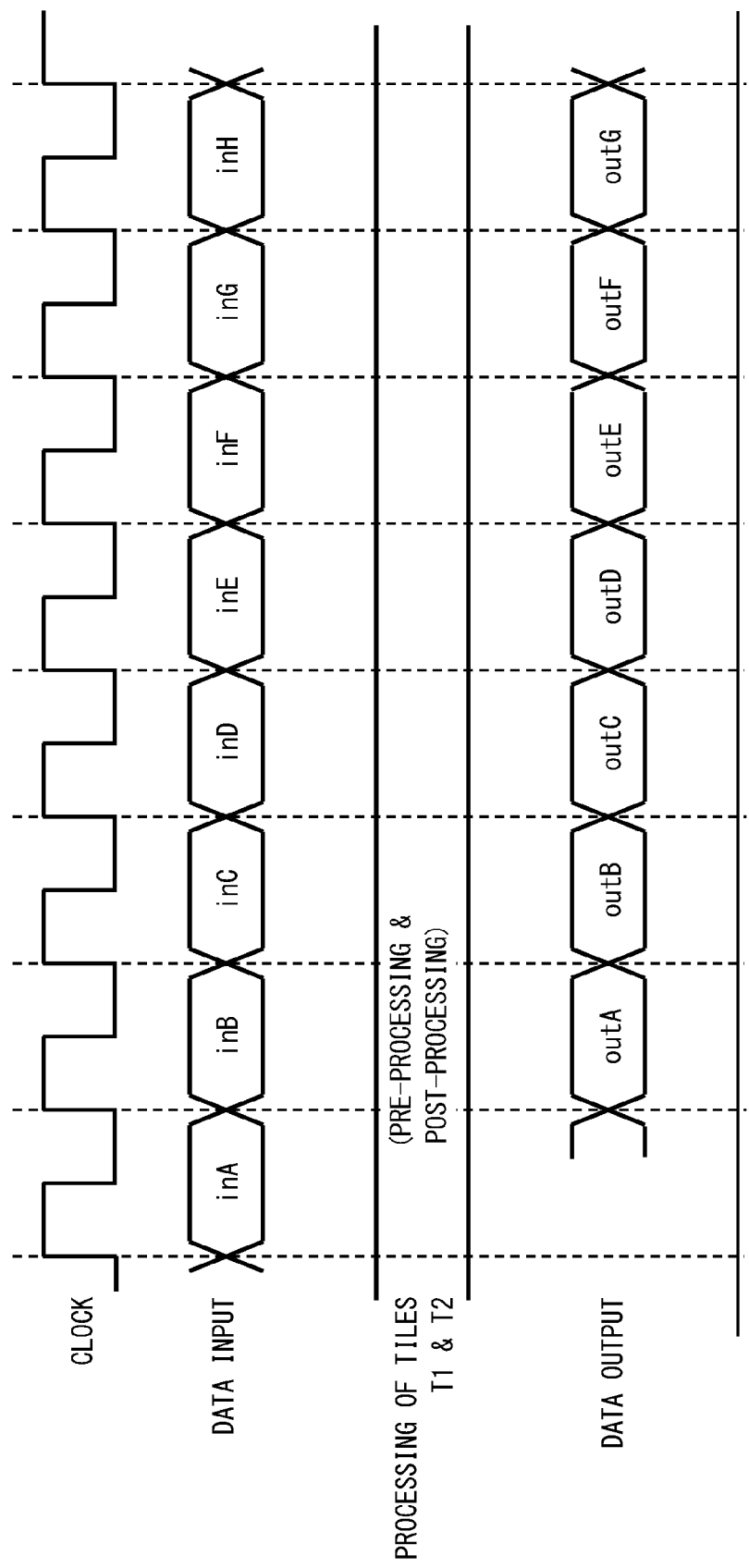
FIG. 8 is a timing chart for explaining an operation in the normal mode of the reconfigurable device shown in FIG. 4.

FIG. 8 is a timing chart showing an operation in the normal mode of the reconfigurable device 1b. Referring to FIG. 8, after the pre-processing and the post-processing are performed on the input data Din in a certain cycle, the processing result is output as the output data Dout in the next cycle. That is, the pre-processing and the post-processing are executed in a total of one cycle. Note that in an example of FIG. 8, the input data Din in each cycle is distinguished and represented by input data inA to inH, and output data Dout corresponding to the input data inA to inH is distinguished and represented by output data outA to outH.

(Operation in First Safe Mode)

Figure 9:
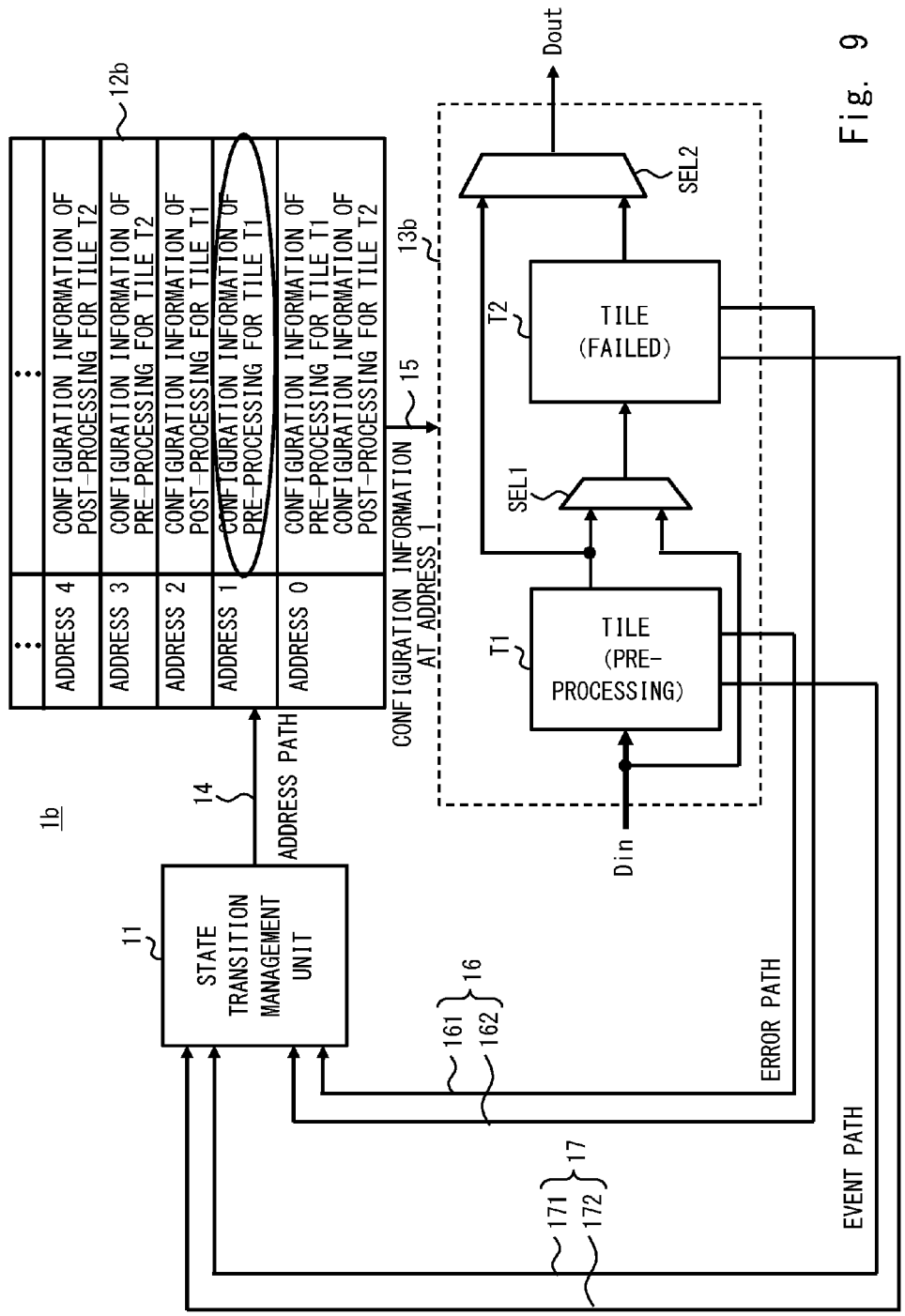
FIG. 9 is a block diagram for explaining an operation of pre-processing in a first safe mode of the reconfigurable device shown in FIG. 4.
Figure 10:
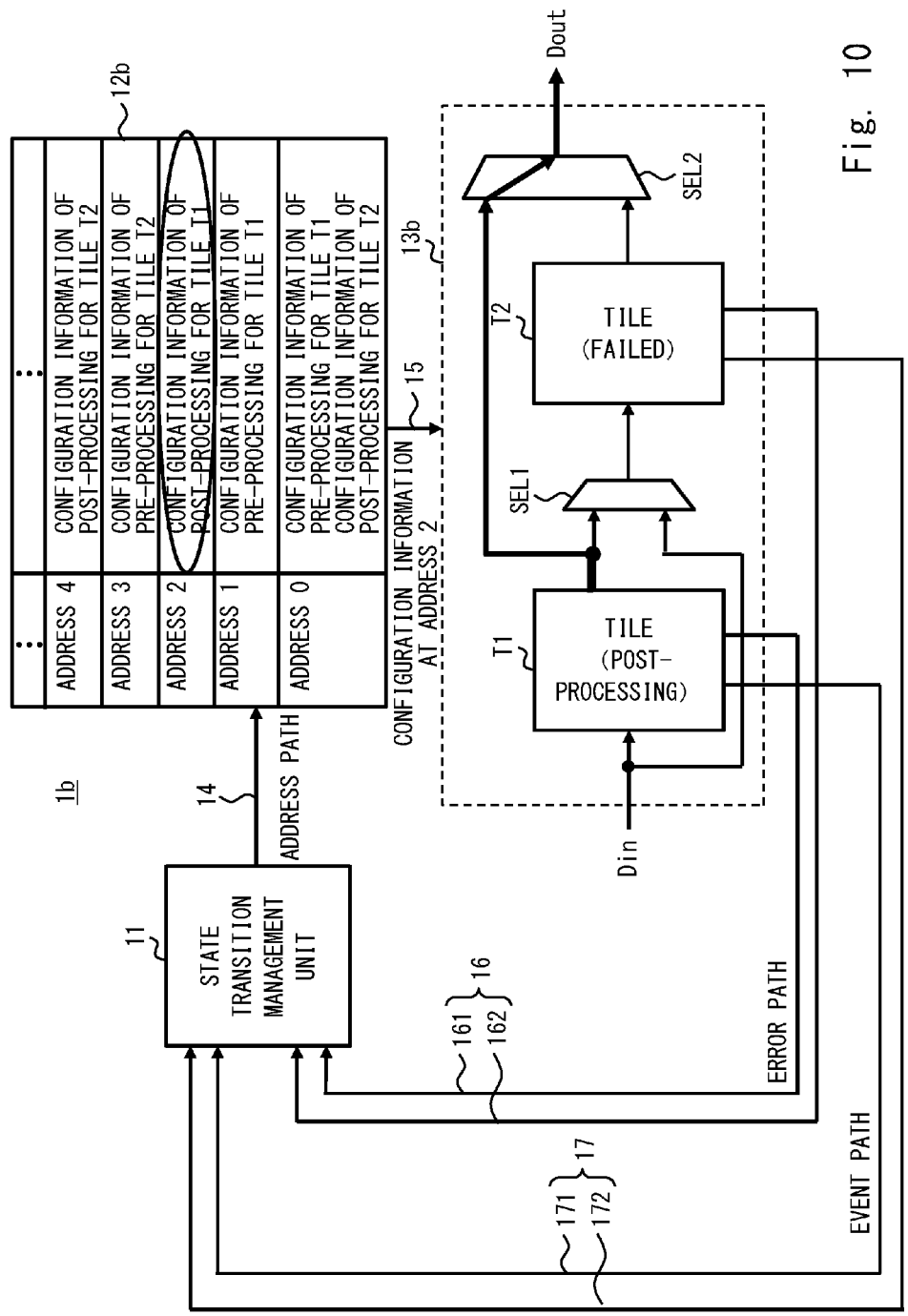
FIG. 10 is a block diagram for explaining an operation of post-processing in the first safe mode of the reconfigurable device shown in FIG. 4.

Next, an operation in a first safe mode of the reconfigurable device 1b will be described. FIGS. 9 and 10 are block diagrams for explaining an operation in the first safe mode of the reconfigurable device 1b.

As shown in FIG. 9, when a failure is detected in the tile T2 that is provided in the data path unit 13b, that is, when the failure detection signal ERF2 output from the tile T2 becomes active, firstly the state transition management unit 11 outputs the address signal indicating an address 1 (ST11 in FIG. 6). Next, the configuration information item stored in the storage region at the address 1 is read out from the configuration information storage memory 12b and then supplied to the data path unit 13b. Thus, the first intermediate processing circuit that executes the pre-processing is configured by the tile T1.

In this state, the input data Din is supplied to the data path unit 13b. The first intermediate processing circuit configured using the tile T1 performs the pre-processing on the input data Din, and when the pre-processing is completed, the first intermediate processing circuit switches the process completion signal EVF1 from inactive to active.

As shown in FIG. 10, when the process completion signal EVF1 becomes active, the state transition management unit 11 switches the address signal to indicate an address 2 from the address signal that indicates the address 1 and then outputs the switched address signal (ST12 in FIG. 6). Next, the configuration information item stored in the storage region at the address 2 is read out from the configuration information storage memory 12b and then supplied to the data path unit 13b. Thus, the second intermediate processing circuit that executes the post-processing is configured by the tile T1. At this time, the selector SEL2 is configured to select and output the output result of the tile T1.

In this state, a result of the pre-processing by the tile T1 is supplied to the second intermediate processing circuit configured using the tile T1. Note that in an example of FIG. 10, a feedback path is not shown. The second intermediate processing circuit configured using the tile T1 performs the post-processing on a result of the pre-processing. Then, the output result of the tile T1 is output outside as the output data Dout of the data path unit 13b. As a result, in the data path unit 13b, a process is executed by a desired processing circuit.

Figure 11:
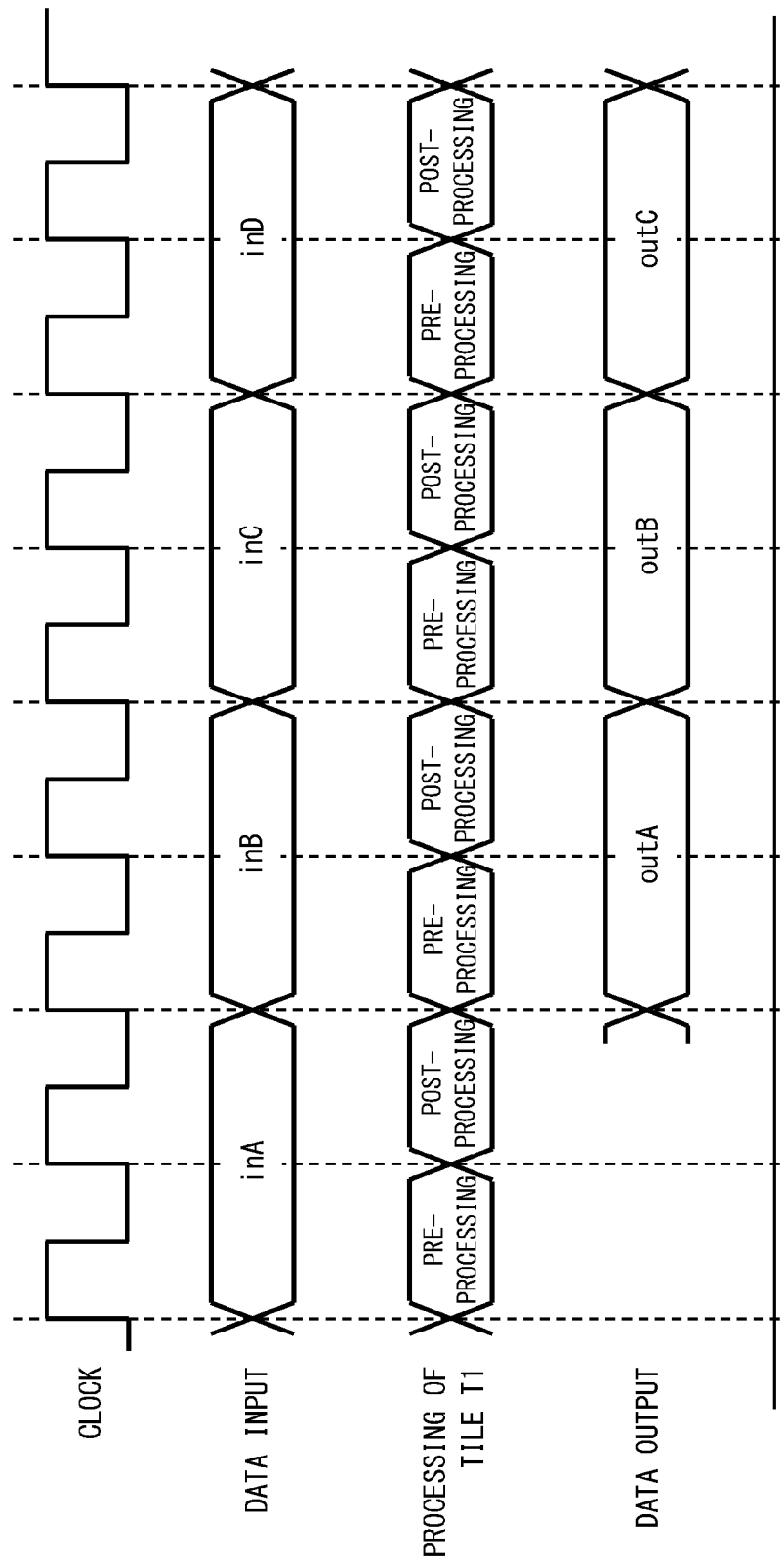
FIG. 11 is a timing chart for explaining an operation in the first safe mode of the reconfigurable device shown in FIG. 4.

FIG. 11 is a timing chart showing an operation in the first safe mode of the reconfigurable device 1b. Referring to FIG. 11, the pre-processing is performed on the input data Din in a certain cycle, the post-processing is performed on the input data Din in the next cycle, and then the input data Din is output as the output data Dout in the next cycle. That is, the pre-processing and the post-processing are executed in a total of two cycles. Note that in an example of FIG. 11, the input data Din in each cycle is distinguished and represented by input data inA to inD, and output data Dout corresponding to the input data inA to inD is distinguished and represented by output data outA to outD.

As described above, even when a failure is detected in the tile T2 of the data path unit 13b, the reconfigurable device 1b executes the pre-processing and the post-processing in a time-sharing manner using the tile T1 in which no failure is detected, so that a process can be executed by a desired processing circuit without skipping low-priority processing.

(Operation in Second Safe Mode)

Figure 12:
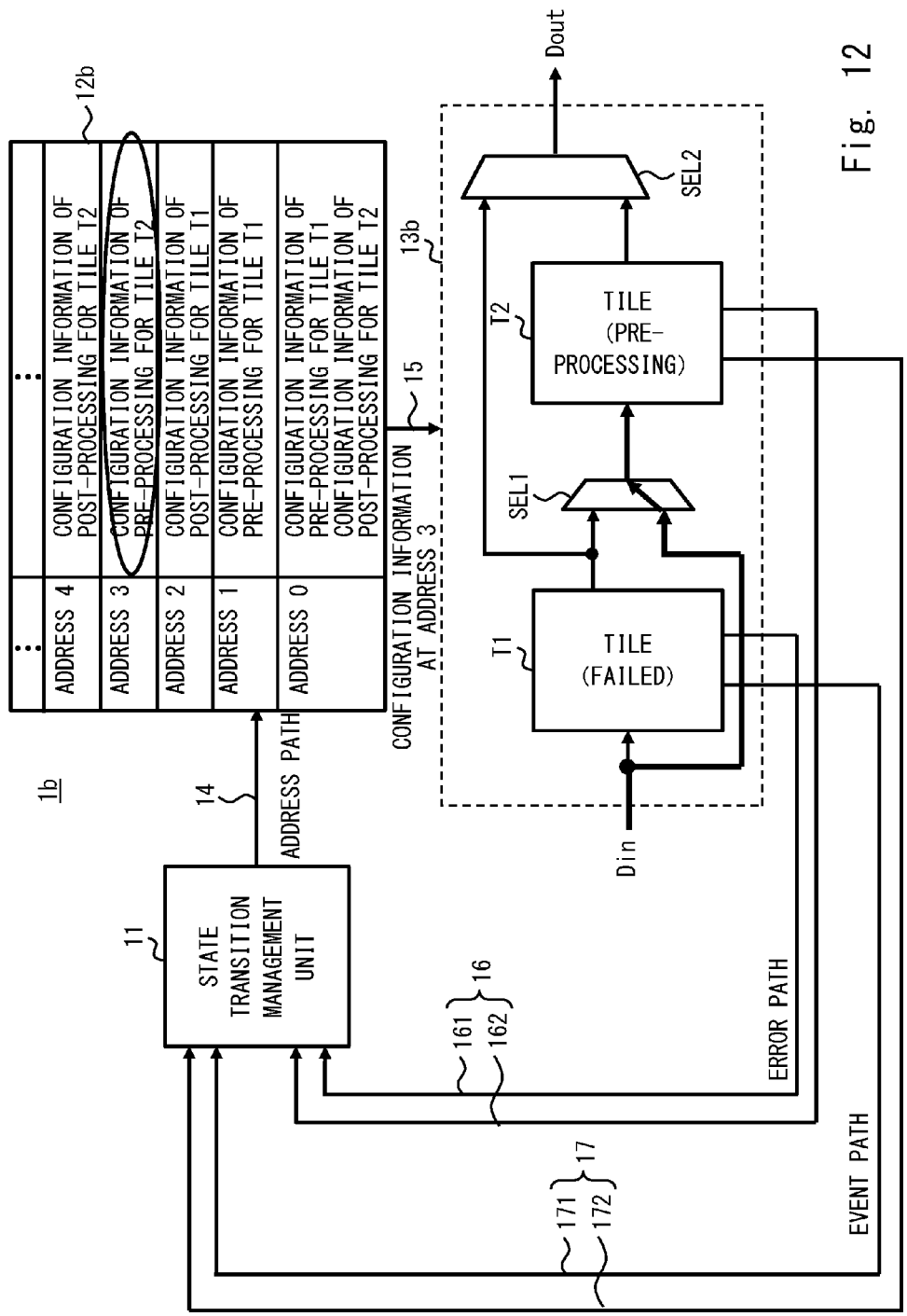
FIG. 12 is a block diagram for explaining an operation of pre-processing in a second safe mode of the reconfigurable device shown in FIG. 4.
Figure 13:
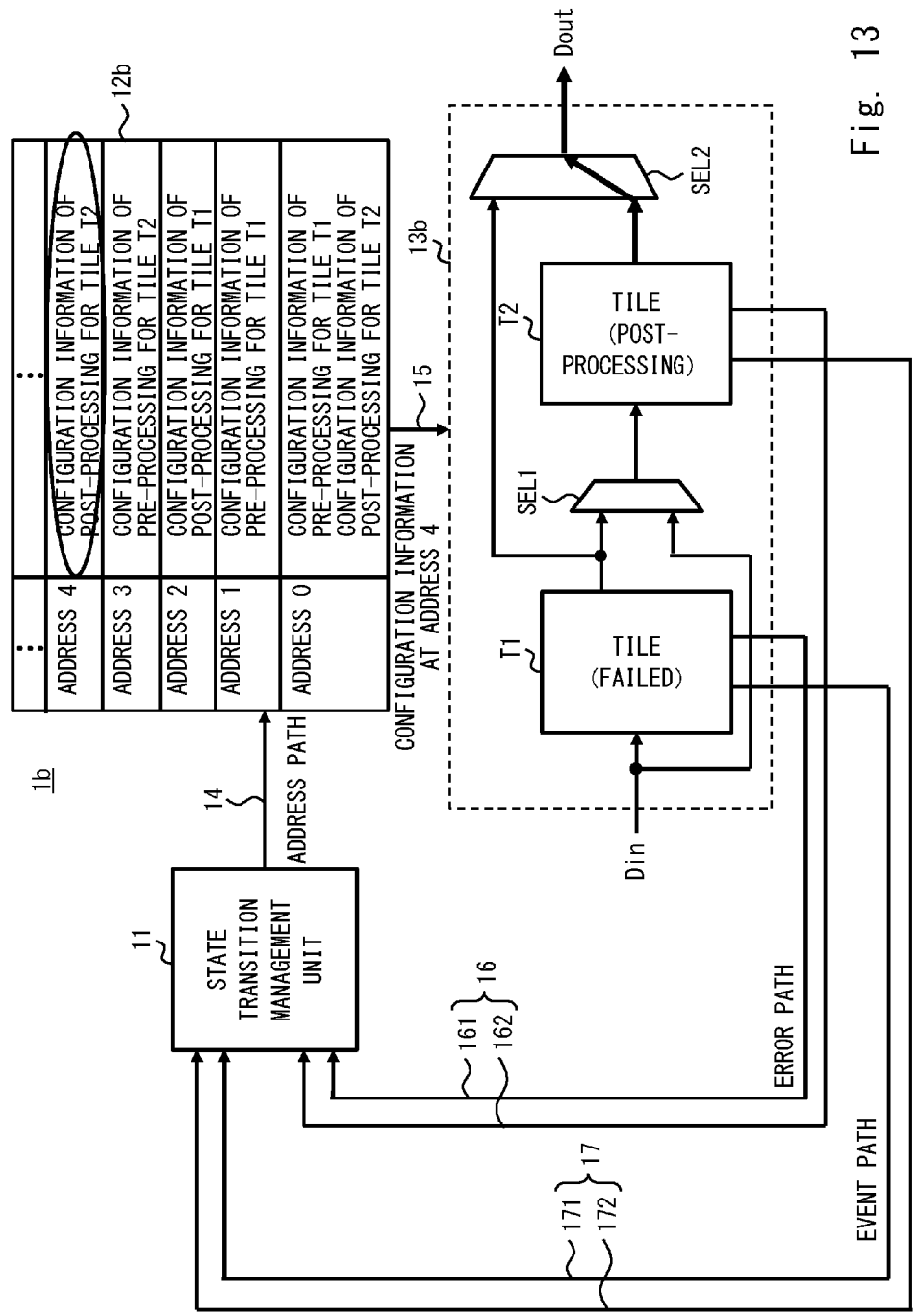
FIG. 13 is a block diagram for explaining an operation of post-processing in the second safe mode of the reconfigurable device shown in FIG. 4.

Next, an operation in the second safe mode of the reconfigurable device 1b will be described. FIGS. 12 and 13 are block diagrams for explaining an operation in the second safe mode of the reconfigurable device 1b.

As shown in FIG. 12, when a failure is detected in the tile T1 provided in the data path unit 13b, that is, when the failure detection signal ERF1 output from the tile T1 becomes active, firstly the state transition management unit 11 outputs the address signal indicating an address 3 (ST13 in FIG. 6). Next, the configuration information item stored in the storage region at the address 3 is read out from the configuration information storage memory 12b and then supplied to the data path unit 13b. Thus, the first intermediate processing circuit that executes the pre-processing is configured by the tile T2. At this time, the selector SEL1 is configured to select and output the input data Din.

In this state, the input data Din is supplied to the data path unit 13b. The first intermediate processing circuit configured using the tile T2 performs the pre-processing on the input data Din, and when the pre-processing is completed, the first intermediate processing circuit switches the process completion signal EVF2 from inactive to active.

As shown in FIG. 13, when the process completion signal EVF2 becomes active, the state transition management unit 11 switches the address signal to indicate an address 4 from the address signal that indicates the address 3 and then outputs the switched address signal (ST14 in FIG. 6). Next, the configuration information item stored in the storage region at the address 4 is read out from the configuration information storage memory 12b and then supplied to the data path unit 13b. At this time, the selector SEL2 is configured to select and output an output result of the tile T2.

In this state, a result of the pre-processing by the tile T2 is supplied to the second intermediate processing circuit configured using the tile T2. Note that in an example of FIG. 13, a feedback path is not shown. The second intermediate processing circuit configured using the tile T2 performs the post-processing on the result of the pre-processing. Then, an output result of the tile T2 is output outside as the output data Dout of the data path unit 13b. As a result, in the data path unit 13b, a process is executed by a desired processing circuit.

As a timing chart showing an operation in the second safe mode of the reconfigurable device 1b is basically the same as the timing chart showing the operation in the first safe mode of the reconfigurable device 1b, a description of the timing chart showing the operation in the second safe mode of the reconfigurable 1b will be omitted.

As described above, even when a failure is detected in the tile T1 of the data path unit 13b, the reconfigurable device 1b executes the pre-processing and the post-processing in a time-sharing manner using the tile T2 in which no failure is detected, so that a process can be executed by a desired processing circuit without skipping low-priority processing.

(Operation of the Reconfigurable Device 1a Having Three Tiles)

Figure 14:
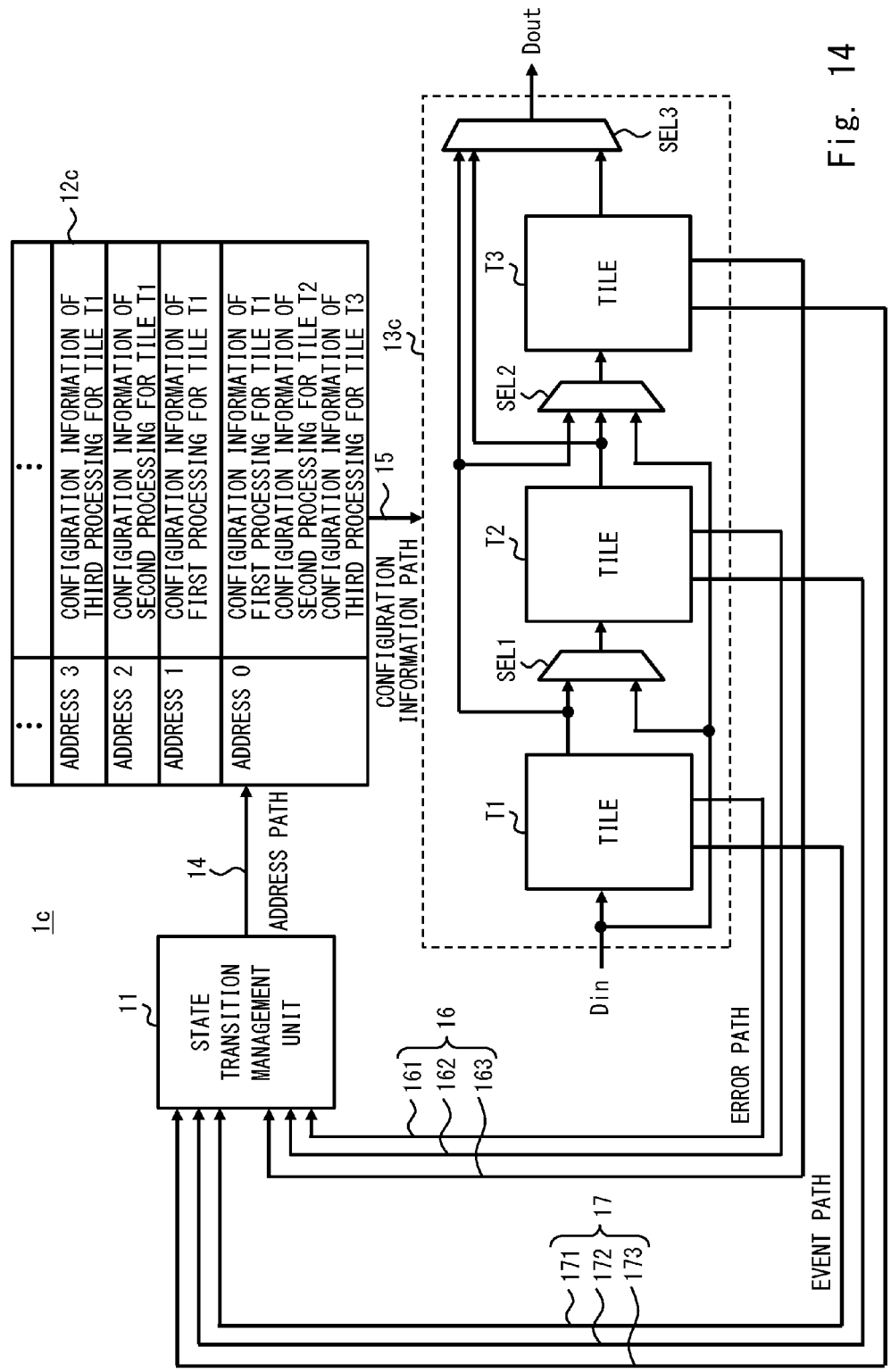
FIG. 14 is a block diagram showing a configuration example when there are three tiles in the reconfigurable device shown in FIG. 2.

FIG. 14 is a block diagram showing a reconfigurable device 1c which is the reconfigurable device 1a having three tiles (n=3).

As shown in FIG. 14, the reconfigurable device 1c includes a configuration information storage memory 12c as the configuration information storage memory 12 and a data path unit 13c as the data path unit 13.

In the configuration information storage memory 12c, for example, a configuration information item in the normal mode is stored in a storage region at an address 0, and configuration information items in the safe mode of the first to third processing are stored in storage regions at addresses 1 to 3, respectively.

The data path unit 13c includes three tiles T1 to T3 and selectors SEL1 to SEL3.

(Operation in Normal Mode)

Figure 15:
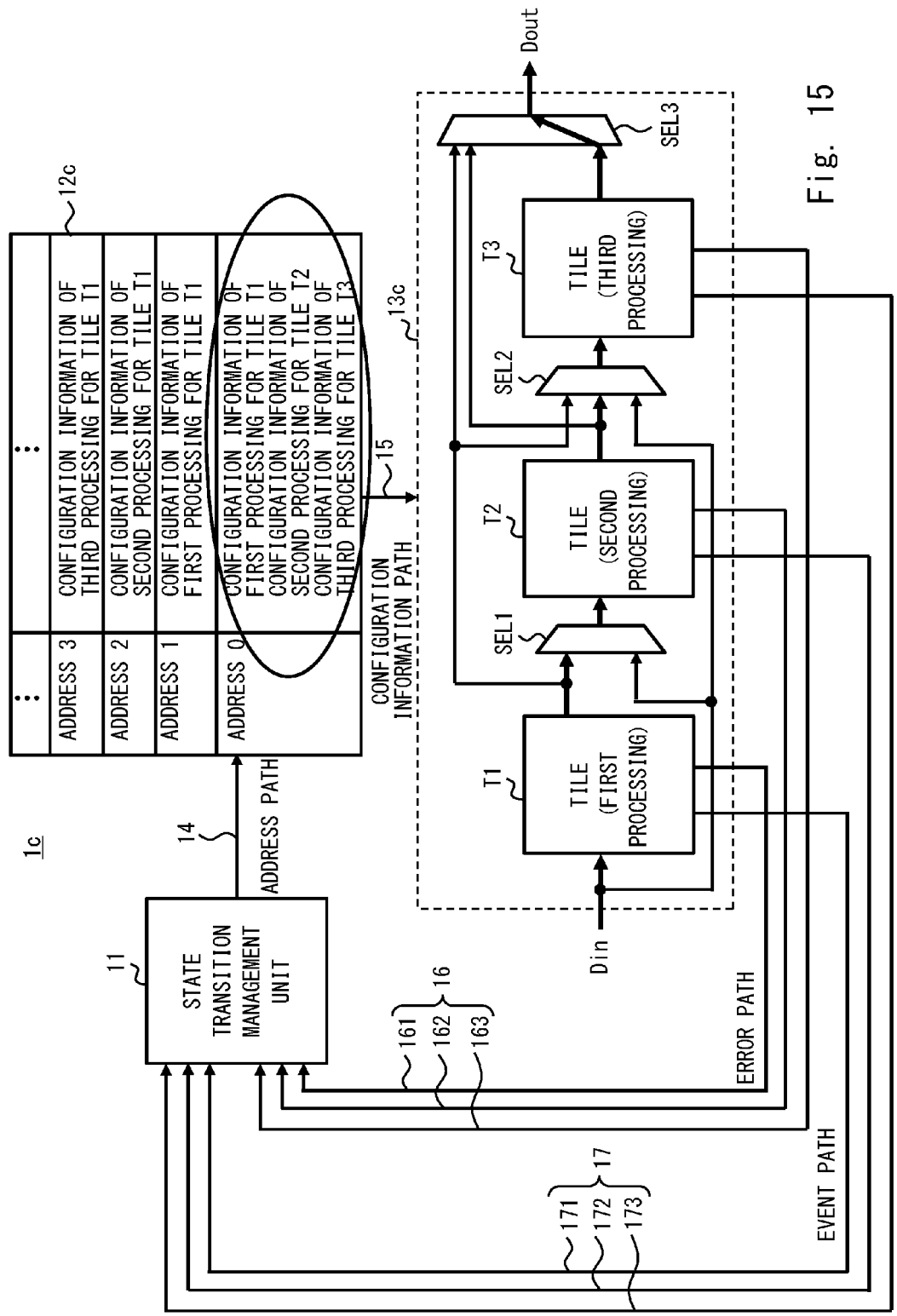
FIG. 15 is a block diagram for explaining an operation in the normal mode of the reconfigurable device shown in FIG. 14.

An operation in the normal mode of the reconfigurable device 1c will be described first. FIG. 15 is a block diagram for explaining the operation in the normal mode of the reconfigurable device 1c.

As shown in FIG. 15, when no failure is detected in the data path unit 13c, that is, when the failure detection signals ERF1 to ERF3 output from the tiles T1 to T3, respectively, are all inactive, the state transition management unit 11 outputs the address signal indicating an address 0. Next, the configuration information item stored in the storage region at the address 0 is read out from the configuration information storage memory 12c and then supplied to the data path unit 13c. Thus, a first intermediate processing circuit that executes first processing is configured by the tile T1, a second intermediate processing circuit that executes second processing is configured by the tile T2, and a third intermediate processing circuit that executes third processing is configured by the tile T3. The selector SEL1 is configured to select and output an output result of the tile T1, the selector SEL2 is configured to select and output an output result of the tile T2, and the selector SEL3 is configured to select and output an output result of the tile T3. As a result, in the data path unit 13c, a process can be executed by a desired processing circuit.

In this state, the input data Din is supplied to the data path unit 13c. The first intermediate processing circuit configured using the tile T1 performs the first processing on the input data Din. After that, the second intermediate processing circuit configured using the tile T2 performs the second processing on the output result of the tile T1. Then, the third intermediate processing circuit configured using the tile T3 performs the third processing on the output result of the tile T2. Thus, the output result of the tile T3 is output outside as the output data Dout of the data path unit 13c. As described above, in the data path unit 13c, a process is executed by a desired processing circuit.

Figure 16:
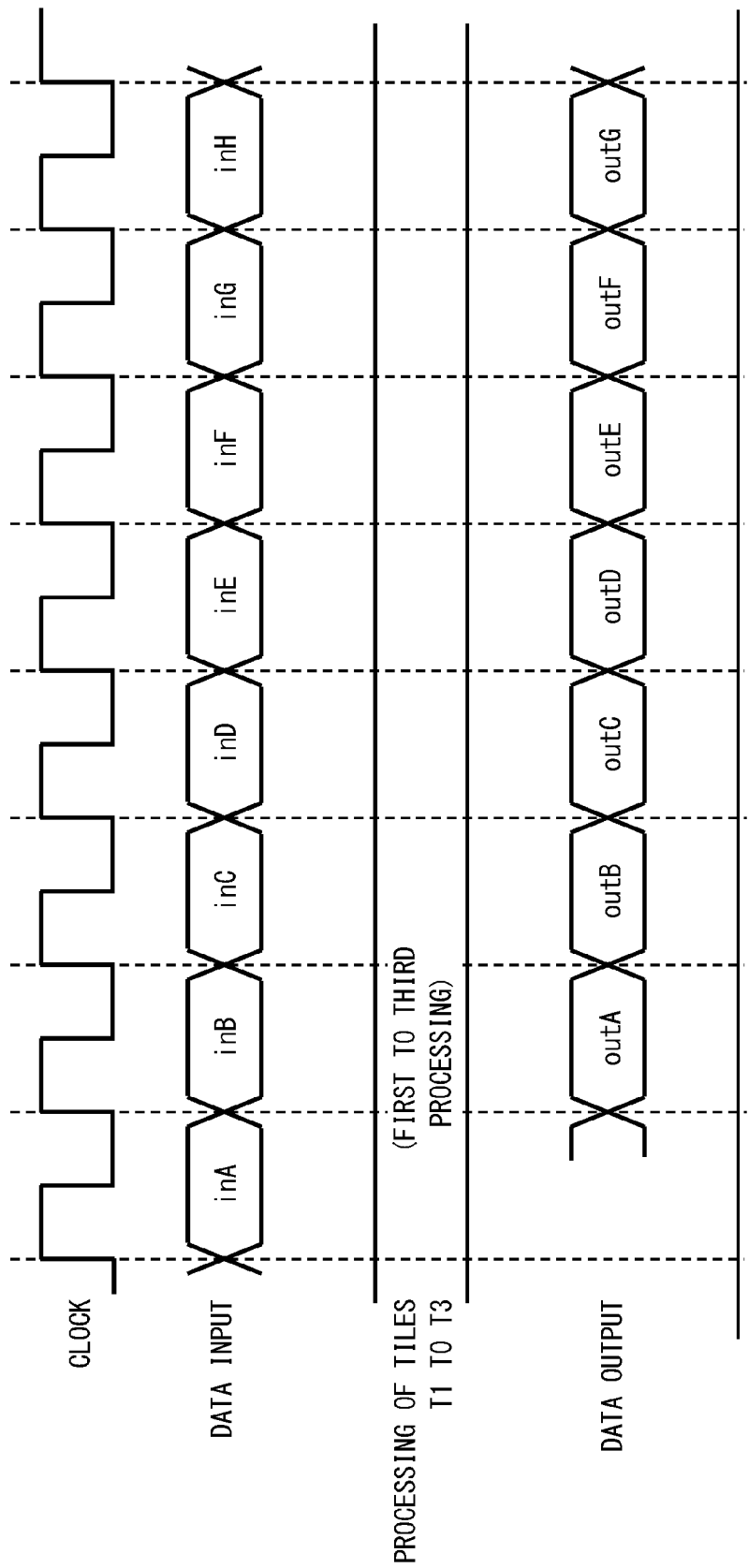
FIG. 16 is a timing chart showing the operation in the normal mode of the reconfigurable device shown in FIG. 14.

FIG. 16 is a timing chart showing an operation in the normal mode of the reconfigurable device 1c. Referring to FIG. 16, the first to third processing are performed on the input data Din in a certain cycle, and then the processing result is output as the output data Dout in the next cycle. That is, the first to third processing are executed in a total of one cycle. Note that in an example of FIG. 16, the input data Din in each cycle is distinguished and represented by input data inA to inH, and output data Dout corresponding to the input data inA to inH is distinguished and represented by output data outA to outH.

(Operation in Safe Mode)

Figure 17:
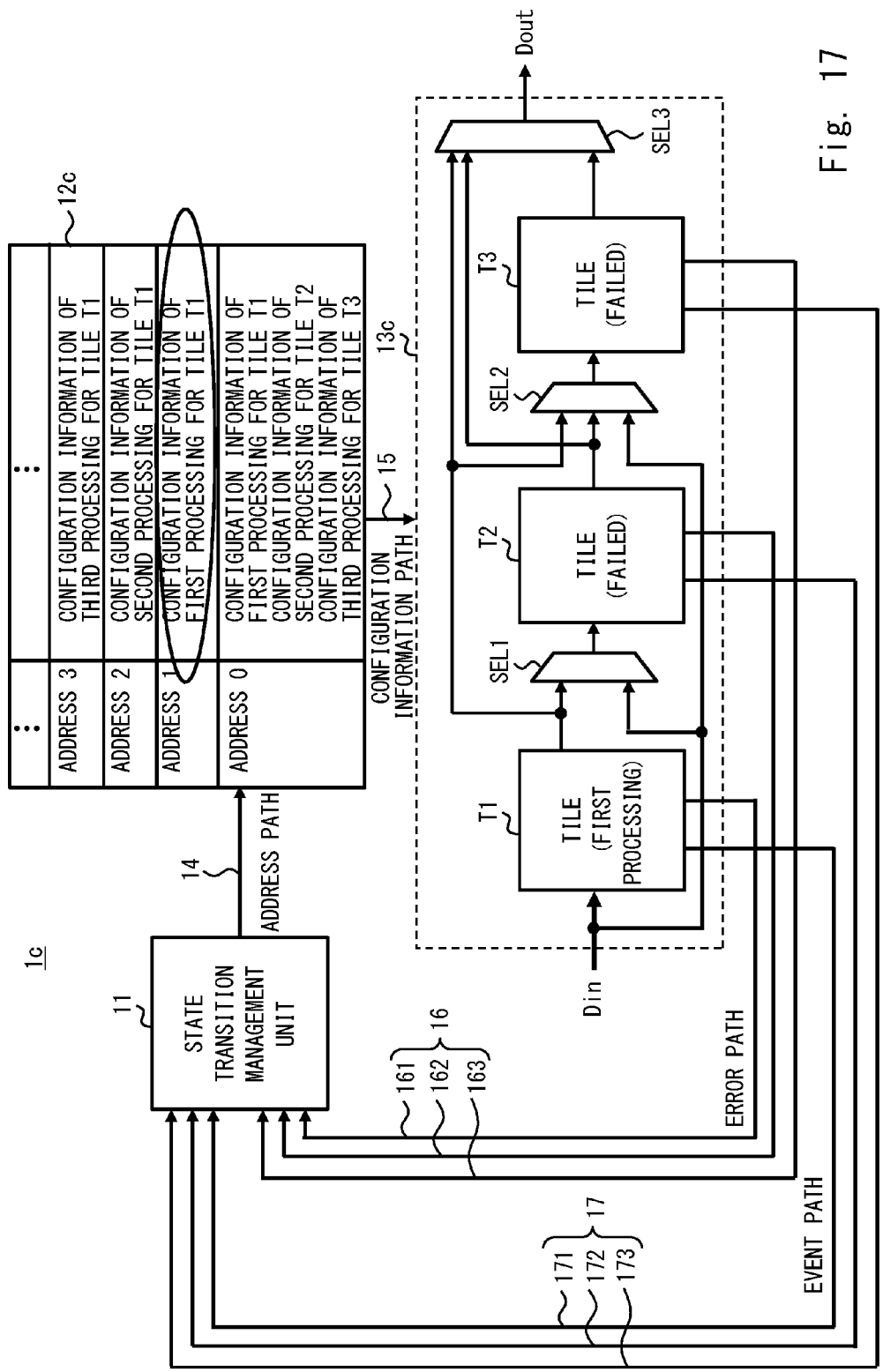
FIG. 17 is a block diagram for explaining an operation of first processing in a safe mode of the reconfigurable device shown in FIG. 14.
Figure 18:
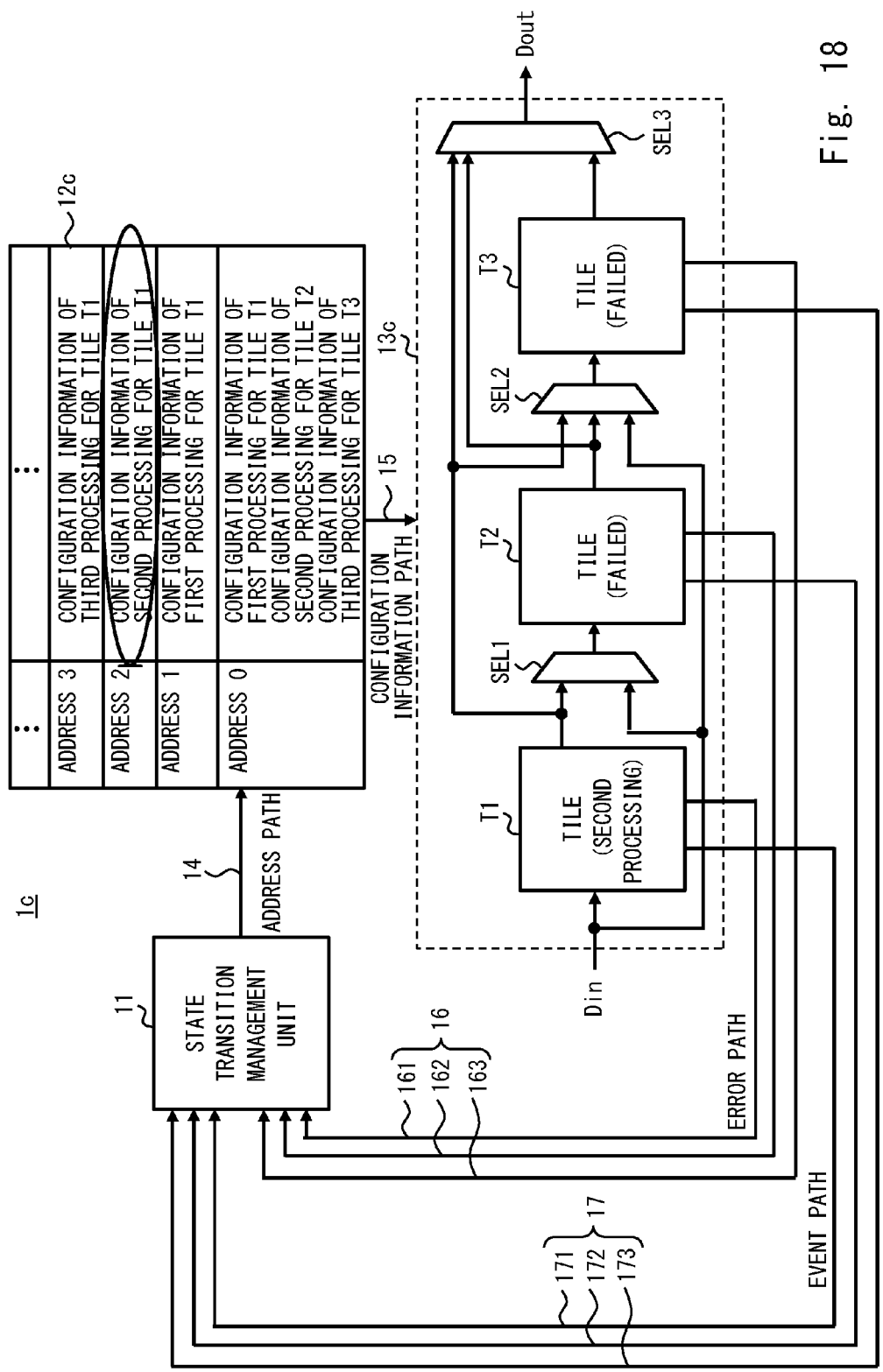
FIG. 18 is a block diagram for explaining an operation of second processing in the safe mode of the reconfigurable device shown in FIG. 14.
Figure 19:
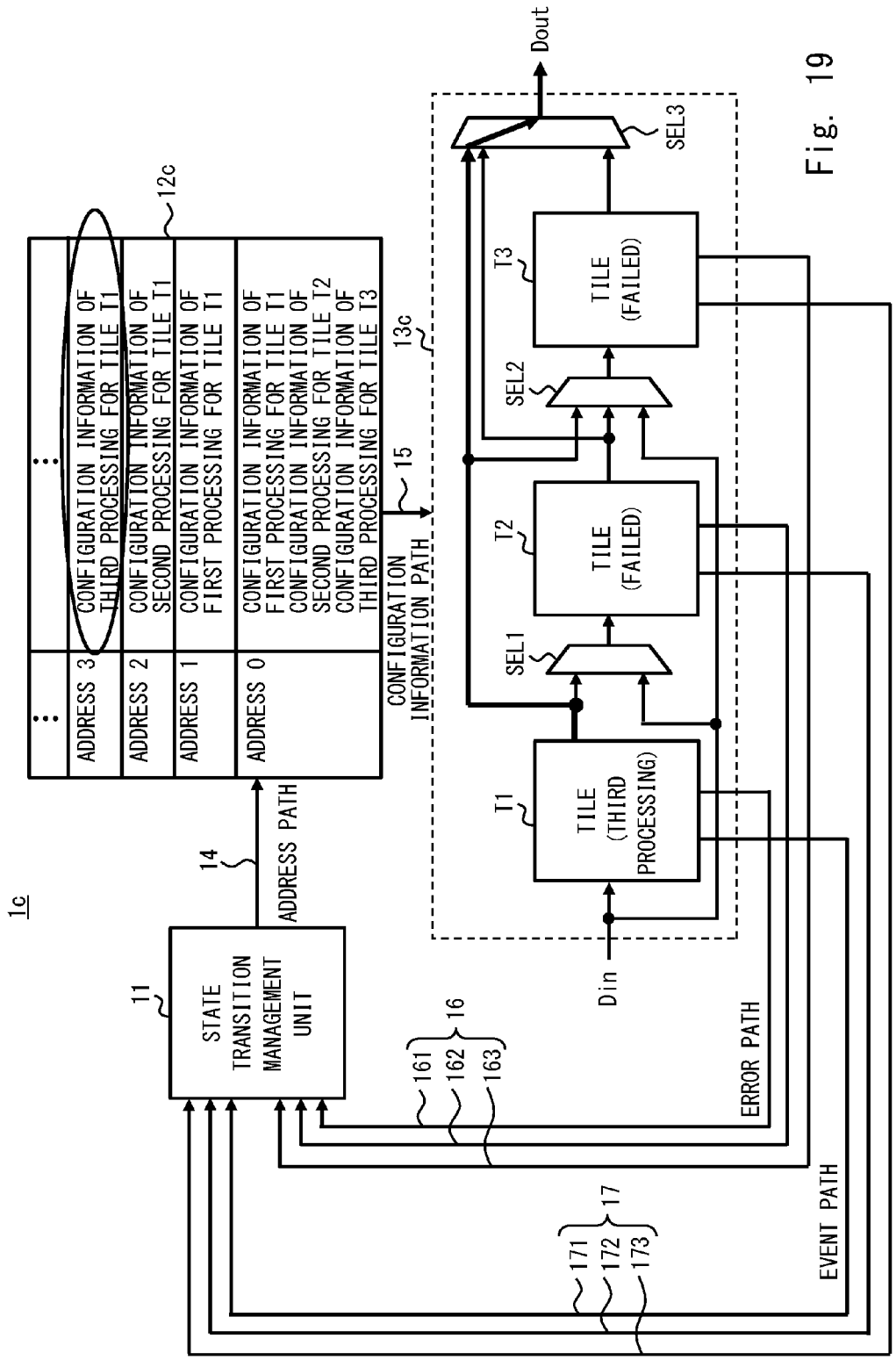
FIG. 19 is a block diagram for explaining an operation of third processing in the safe mode of the reconfigurable device shown in FIG. 14.

Next, an operation in one safe mode of the reconfigurable device 1c will be described. FIGS. 17 to 19 are block diagrams for explaining the operation in the safe mode of the reconfigurable device 1c.

As shown in FIG. 17, when failures are detected in the tiles T2 and T3 provided in the data path unit 13c, that is, when the failure detection signals ERF2 and ERF3 output respectively from the tiles T2 and T3 become active, firstly the state transition management unit 11 outputs the address signal indicating an address 1. Next, the configuration information item stored in the storage region at the address 1 is read out from the configuration information storage memory 12c and then supplied to the data path unit 13c. Thus, the first intermediate processing circuit that executes the first processing is configured by the tile T1.

In this state, the input data Din is supplied to the data path unit 13c. The first intermediate processing circuit configured using the tile T1 performs the first processing on the input data Din, and when the first processing is completed, the first intermediate processing circuit switches the process completion signal EVF1 from inactive to active.

As shown in FIG. 18, when the process completion signal EVF1 becomes active, the state transition management unit 11 switches the address signal to indicate an address 2 from the address signal that indicates the address 1 and then outputs the switched address signal. Next, the configuration information item stored in the storage region at the address 2 is read out from the configuration information storage memory 12c and then supplied to the data path unit 13c. Thus, the second intermediate processing circuit that executes the second processing is configured by the tile T1.

In this state, a result of the first processing by the tile T1 is supplied to the second intermediate processing circuit configured using the tile T1. Note that in an example of FIG. 18, a feedback path is not shown. The second intermediate processing circuit configured using the tile T1 performs the second processing on the result of the first processing, and when the second processing is completed, the second intermediate processing circuit switches the process completion signal EVF1 from inactive to active.

As shown in FIG. 19, when the process completion signal EVF1 becomes active, the state transition management unit 11 switches the address signal to indicate an address 3 from the address signal that indicates the address 2 and then outputs the switched address signal. Next, the configuration information item stored in the storage region at the address 3 is read out from the configuration information storage memory 12c and then supplied to the data path unit 13c. Thus, the third intermediate processing circuit that executes the third processing is configured by the tile T1. At this time, the selector SEL3 is configured to select and output the output result of the tile T1.

In this state, a result of the second processing by the tile T1 is supplied to the third intermediate processing circuit configured using the tile T1. Note that in an example of FIG.

19, a feedback path is not shown. The third intermediate processing circuit configured using the tile T1 performs the third processing on the result of the second processing. Then, the output result of the tile T1 is output outside as the output data Dout of the data path unit 13c. As a result, in the data path unit 13c, a process is executed by a desired processing circuit.

Figure 20:
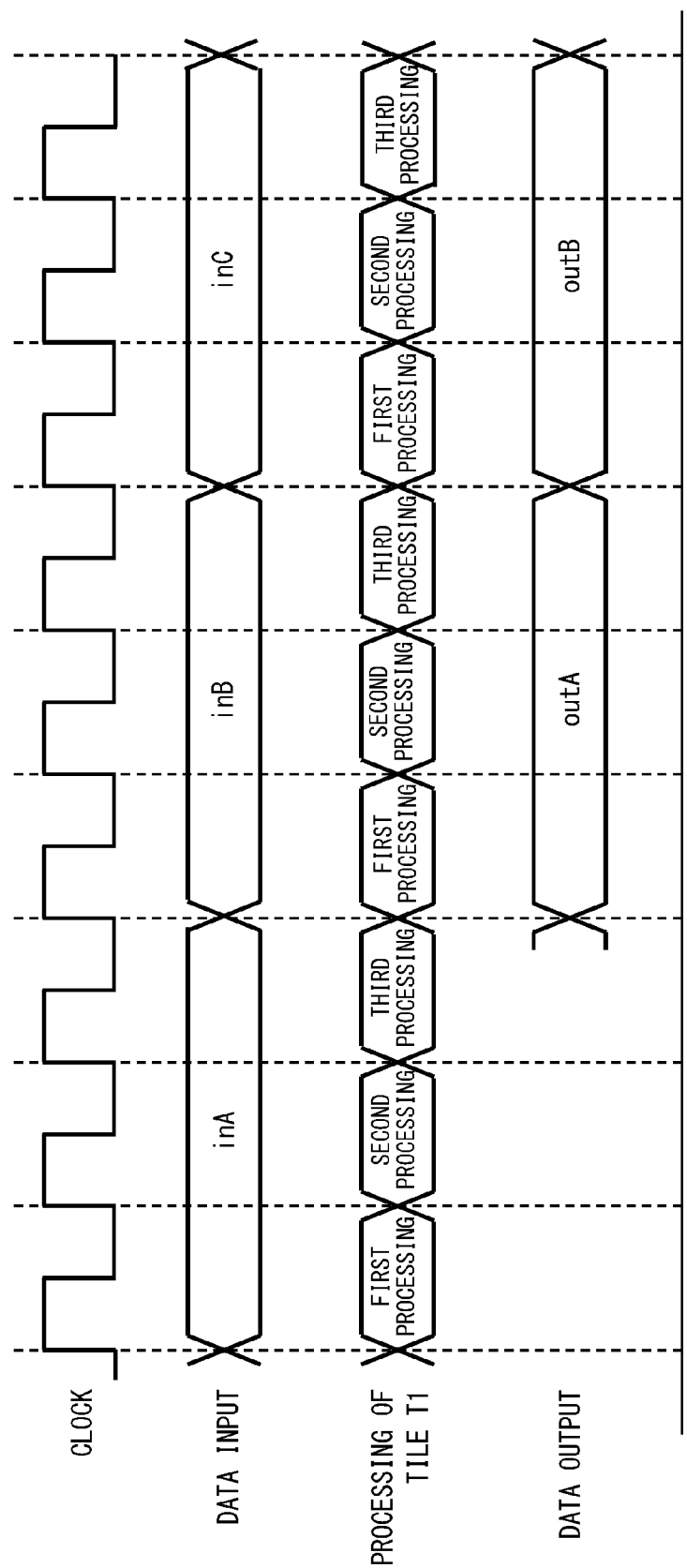
FIG. 20 is a timing chart showing an operation in the safe mode of the reconfigurable device shown in FIG. 14.

FIG. 20 is a timing chart showing an operation in the safe mode of the reconfigurable device 1c. Referring to FIG. 20, the first processing is performed on the input data Din in a certain cycle, the second processing is performed on the input data Din in the next cycle, the third processing is performed on the input data Din in the next cycle, and then the input data Din is output as the output data Dout in the next cycle. That is, the first to third processing are executed in a total of three cycles. Note that in an example of FIG. 20, the input data Din in each cycle is distinguished and represented by input data inA to inC, and output data Dout corresponding to the input data inA to inC is distinguished and represented by output data outA to outC.

As described above, even when failures are detected in the tiles T2 and T3 of the data path unit 13c, the reconfigurable device 1c executes the first to third processing in a time-sharing manner using the tile T1 in which no failure is detected, so that a process can be executed by a desired processing circuit without skipping low-priority processing.

Although an example in which the tiles T2 and T3 fail has been described, it is not limited to this. More specifically, when the tiles T1 and T2 fail, or when the tiles T1 and T3 fail, a process can be executed by a desired processing circuit. Note that when the tiles T1 and T3 fail, the first to third processing are executed in a time-sharing manner using the tile T2 in which no failure is detected. When the tiles T1 and T2 fail, the first to third processing are executed in a time-sharing manner using the tile T3 in which no failure is detected.

Although an example in which two tiles from among the three tiles T1 to T3 fail has been described, it is not limited to this. More specifically, when any one of the three tiles T1 to T3 fails, a process can be executed by a desired processing circuit. In this case, the first to third processing are executed in a time-sharing manner using one or two tiles in which no failure is detected.

Moreover, although examples in which two or three tiles are provided have been described in the above embodiments, it is not limited to this, and four or more tiles may be provided.

In the reconfigurable device according to this embodiment, when a failure is detected in any one of a plurality of tiles provided in a dynamically reconfigurable data path unit, the first intermediate processing circuit is configured using the tile in which no failure is detected, and then the second intermediate processing circuit is configured again using the tile in which no failure is detected, in order to achieve a desired first processing circuit. Thus, the reconfigurable device according to this embodiment can execute desired processing without skipping low-priority processing even when a failure is detected.

Second Embodiment

Figure 21:
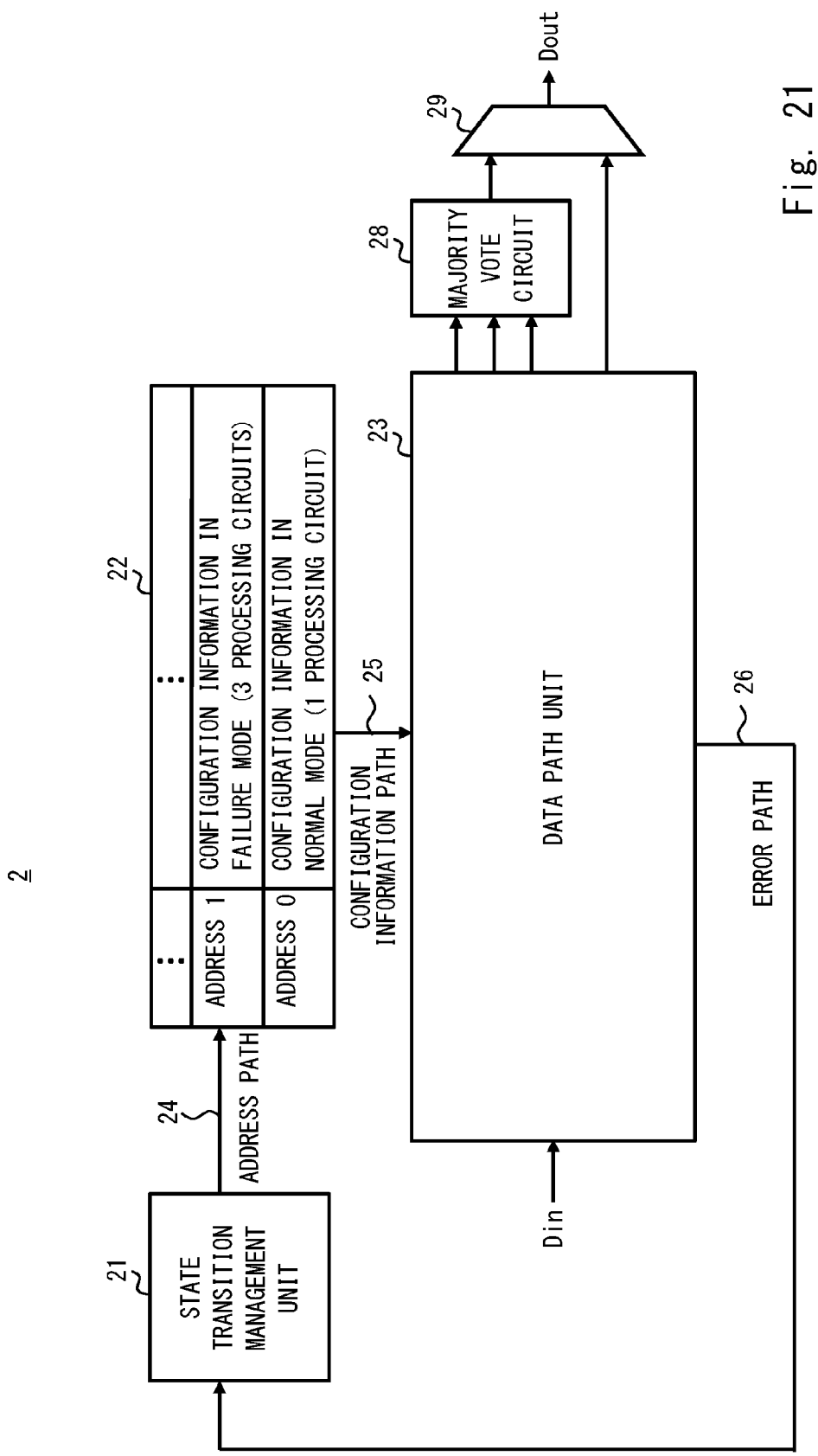
FIG. 21 is a block diagram showing a configuration example of a reconfigurable device according to a second embodiment.

FIG. 21 is a block diagram showing a configuration example of a reconfigurable device (a semiconductor device) 2 according to a second embodiment. In the reconfigurable device 2 according to this embodiment, when a failure is detected in any one of a plurality of logic circuits provided in a dynamically reconfigurable data path unit, a plurality of first processing circuits are configured using some or all of the plurality of logic circuits, and a final result of processing by the first processing circuits is determined according to results of processing by the respective plurality of first processing circuits. Thus, the reconfigurable device 2 according to this embodiment can output the result of processing highly accurately even when a failure is detected. Moreover, in a manner similar to that of the reconfigurable device 1, the reconfigurable device 2 according to this embodiment can execute desired processing without skipping low-priority processing even when a failure is detected. Hereinafter, the reconfigurable device 2 will be described in detail.

As shown in FIG. 21, the reconfigurable device 2 includes a state transition management unit 21, a configuration information storage memory 22, a data path unit 23, a majority vote circuit 28, and a selector 29. Further, an error path 26 is provided between the data path unit 23 and the state transition management unit 21. An address path 24 is provided between the state transition management unit 21 and the configuration information storage memory 22. A configuration information path 25 is provided between the configuration information storage memory 22 and the data path unit 23.

Note that the state transition management unit 21, the configuration information storage memory 22, the data path unit 23, the address path 24, the configuration information path 25, and the error path 26 respectively correspond to the state transition management unit 11, the configuration information storage memory 12, the data path unit 13, the address path 14, the configuration information path 15, and the error path 16. Different configurations and operations from those explained in the first embodiment will be mainly described in this embodiment.

In the configuration information storage memory 22, for example, a configuration information item in the normal mode is stored in a storage region at an address 0, and a configuration information item in the failure mode is stored in a storage region at an address 1.

Figure 22:
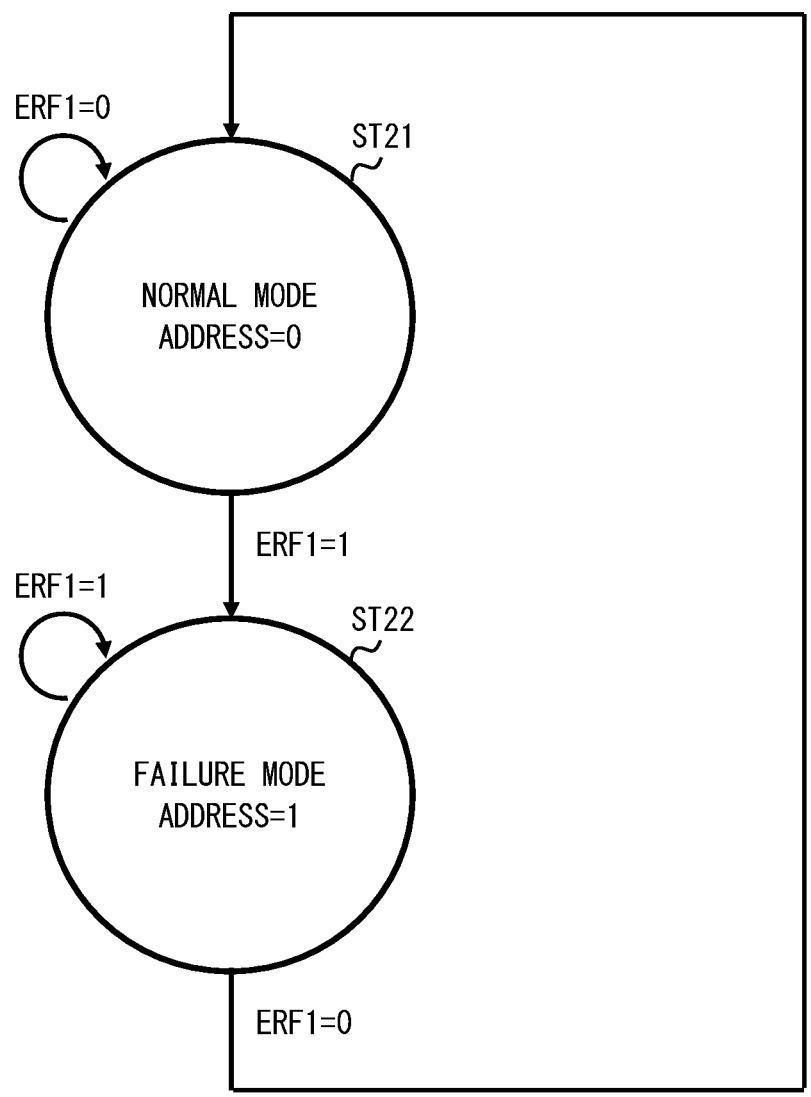
FIG. 22 is a state transition diagram of the reconfigurable device shown in FIG. 21.

FIG. 22 is a state transition diagram of the reconfigurable device 2. Details of the state transition diagram will be described later together with a description of an operation of the reconfigurable device 2.

(Operation in Normal Mode)

Figure 23:
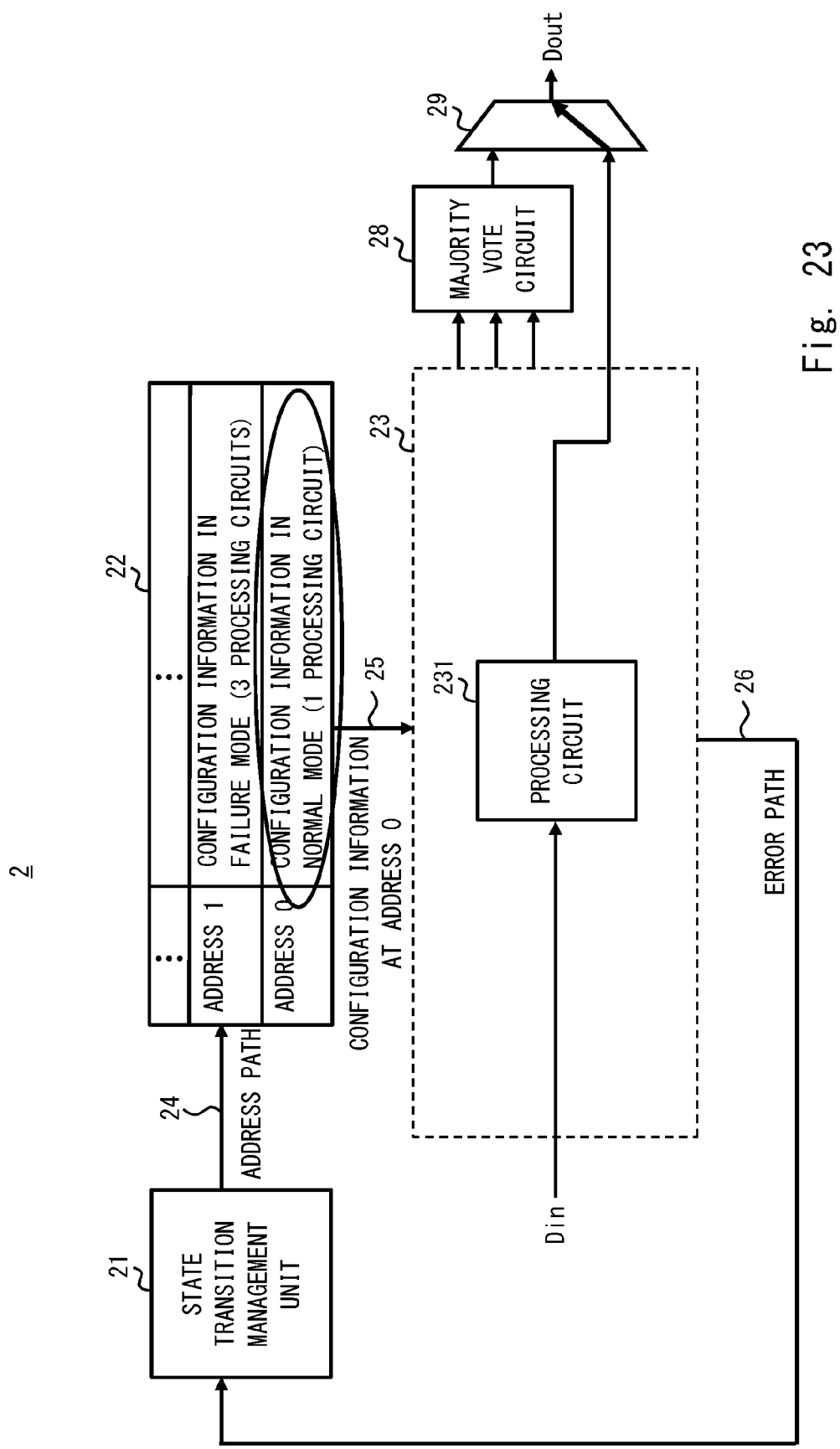
FIG. 23 is a block diagram for explaining an operation in the normal mode of the reconfigurable device shown in FIG. 21.

An operation in the normal mode of the reconfigurable device 2 will be described first. FIG. 23 is a block diagram for explaining the operation in the normal mode of the reconfigurable device 2.

As shown in FIG. 23, when a failure is not detected in any one of the plurality of logic circuits provided in the data path unit 23, that is, when the failure detection signal ERF1 output from the data path unit 23 is inactive, the state transition management unit 21 outputs the address signal indicating an address 0 (ST21 in FIG. 22). Next, the configuration information item stored in the storage region at the address 0 is read out from the configuration information storage memory 22 and then supplied to the data path unit 23. Then, a first processing circuit 231 is configured by some of the plurality of logic circuits provided in the data path unit 23.

In this state, the input data Din is supplied to the data path unit 23. The first processing circuit 231 configured using some of the plurality of logic circuits provided in the data path unit 23 performs predetermined processing on the input data Din. A result of processing by the first processing circuit 231 is output outside the data path unit 23. At this time, the selector 29 selects the result of processing by the first processing circuit 231 and outputs it as the output data Dout.
(Operation in Failure Mode)

Figure 24:
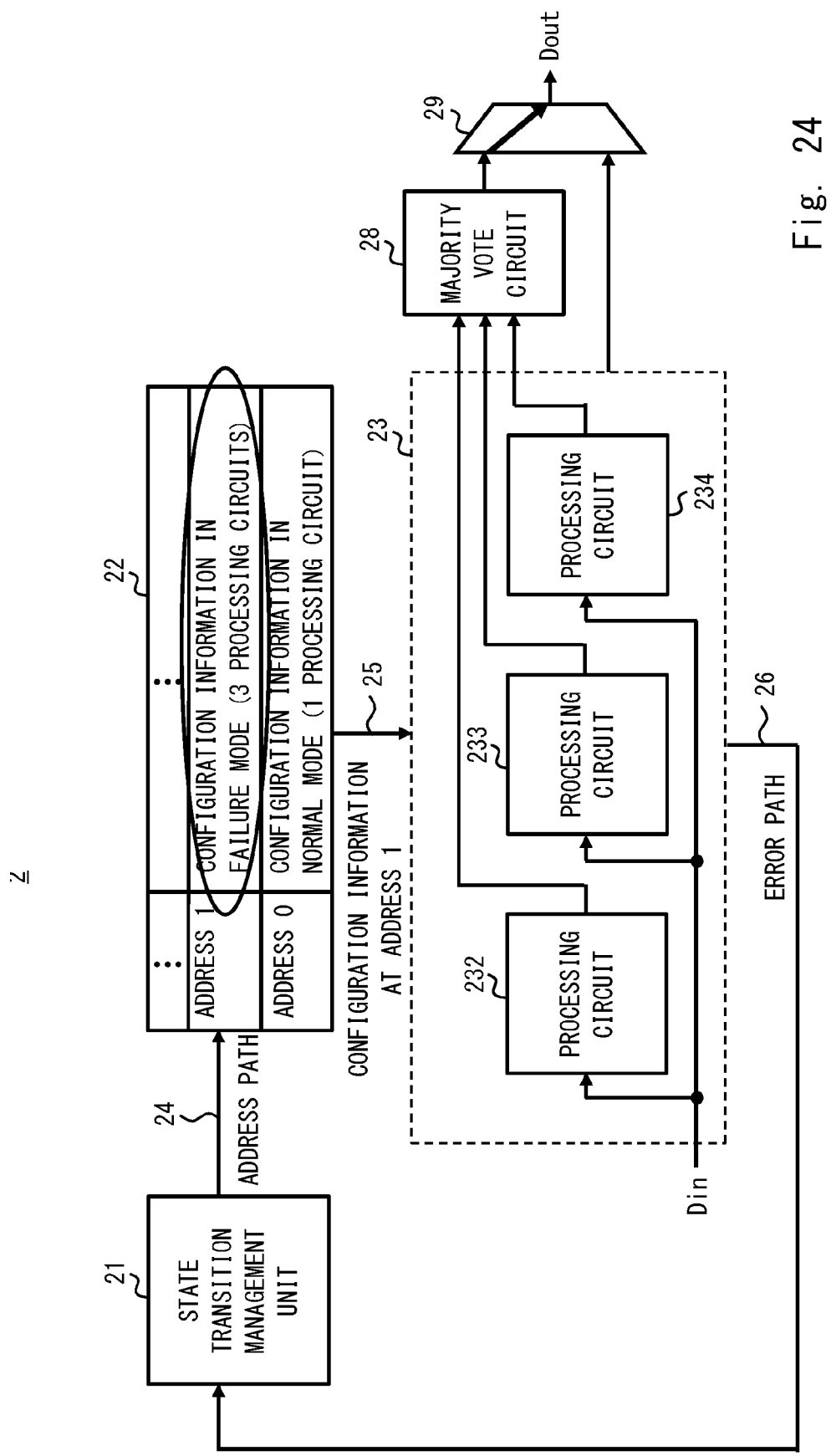
FIG. 24 is a block diagram for explaining an operation in a failure mode of the reconfigurable device shown in FIG. 21.

Next, an operation in the failure mode of the reconfigurable device 2 will be described. FIG. 24 is a block diagram for explaining an operation in the failure mode of the reconfigurable device 2.

As shown in FIG. 24, when a failure is detected in any one of the plurality of logic circuits provided in the data path unit 23, that is, when the failure detection signal ERF1 output from the data path unit 23 becomes active, the state transition management unit 21 outputs the address signal indicating an address 1 (ST22 in FIG. 22). Next, the configuration information item stored in the storage region at the address 1 is read out from the configuration information storage memory 22 and then supplied to the data path unit 23. Thus, three first processing circuits 232 to 234 having the same configuration are configured by some or all of the plurality of logic circuits provided in the data path unit 23.

In this state, the input data Din is supplied to the data path unit 23. Each of the first processing circuits 232 to 234 configured by some or all of the plurality of logic circuits provided in the data path unit 23 performs processing on the input data Din in parallel. Results of the processing by the first processing circuits 232 to 234 are output outside the data path unit 23.

The majority vote circuit 28 outputs the result of processing of a logical value that accounts for a majority of the results of the processing by the first processing circuits 232 to 234. The selector 29 selects an output result of the majority vote circuit 28 and output it as the output data Dout. That is, the result of processing of the logical value that accounts for a majority of the results of the processing by the first processing circuits 232 to 234 is used as the result of processing by the first processing circuit 231.

As described above, in the reconfigurable device 2, when a failure is detected in any one of the plurality of logic circuits provided in the data path unit 23, three first processing circuits 232 to 234 having the same configuration are configured using some or all of the plurality of logic circuits, and the result of the processing of the logical value that accounts for a majority of the results of the processing by the respective first processing circuits 232 to 234 is output as the result of the processing by the first processing circuit 231. Thus, the reconfigurable device 2 according to this embodiment can output the result of processing highly accurately even when a failure is detected. Moreover, in a manner similar to that of the reconfigurable device 1, the reconfigurable device 2 according to this embodiment can execute desired processing without skipping low-priority processing even when a failure is detected.

Further, in the reconfigurable device 2, when a failure is not detected in any one of the plurality of logic circuits provided in the data path unit 23, a single first processing circuit 231 is configured using some of the plurality of logic circuits. By doing so, the reconfigurable device 2 can configure other processing circuits using remaining logic circuits (hardware resources).

Moreover, as it is not necessary to divide a circuit into a plurality of tiles, it is easy to incorporate the reconfigurable device 2.

In this embodiment, although an example in which three first processing circuits 232 to 234 are configured when a failure is detected in the data path unit 23 has been described, it is not limited to this. More specifically, four or more first processing circuits may be configured in order to further improve the accuracy.

In addition, in this embodiment, although an example in which the majority vote circuit 28 and the selector 29 are provided has been described, it is not limited to this. The majority vote circuit 28 and the selector 29 may be configured using some of the plurality of logic circuits provided in the data path unit 23.

Although the invention carried out by the present inventor has been described in detail based on the embodiments, it is obvious that the present invention is not limited to the above-described embodiments, and various modifications can be made without departing from the scope of the invention.

For example, in the semiconductor device according to the above embodiments, a conductivity type (p-type or n-type) of a semiconductor substrate, a semiconductor layer, and a diffusion layer (a diffusion region) may be inverted. Therefore, when one of the conductivity types, which are an n-type and p-type, is considered to be a first conductivity type, and the other one of the conductivity types is considered to be a second conductivity type, the first conductivity type may be a p-type and the second conductivity type may be an n-type. Conversely, the first conductivity type may be an n-type, and the second conductivity type may be a p-type.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
a configuration information storage memory that stores a plurality of configuration information items;
a state transition management unit that selects any one of the plurality of configuration information items; and
a data path unit that dynamically reconfigures a circuit according to the configuration information item selected by the state transition management unit, wherein
when a failure is not detected in any one of a plurality of logic circuit groups provided in the data path unit, the state transition management unit selects the configuration information item so that a first processing circuit is configured using some or all of the plurality of logic circuit groups, and
when a failure is detected in any one of the plurality of logic circuit groups, the state transition management unit selects the configuration information item so that a first intermediate processing circuit is configured using some or all of logical circuit groups in which no failure is detected from among the plurality of logic circuit groups, and then a second intermediate processing circuit is configured using some or all of the logical circuit groups in which no failure is detected from among the plurality of logic circuit groups, in order to achieve the first processing circuit.

2. The semiconductor device according to claim 1, wherein the state transition management unit selects the configuration information item so that the second intermediate processing circuit is configured after a process completion signal indicating a completion of processing by the first intermediate processing circuit becomes active.

3. The semiconductor device according to claim 1, wherein an address path is provided between the state transition management unit and the configuration information storage memory, and
wherein a configuration information path is provided between the configuration information storage memory and the data path unit.

4. The semiconductor device according to claim 1, wherein the data path comprises a processor that dynamically reconfigures a circuit or plurality of circuits according to the configuration information item supplied from outside of the semiconductor device, and performs processing using a reconfigured circuit on input data, and outputs obtained output data.

5. The semiconductor device according to claim 1, wherein the data path unit activates a process completion signal including switching a level of the process completion signal when the process is completed, and activates a failure detection signal by switching a level of the failure detection signal when a failure is detected.

6. The semiconductor device according to claim 1, wherein the configuration information storage memory stores at least one or a plurality of configuration information items that are selected when a failure is not detected in the data path unit in a normal mode of operation and a plurality of configuration information items that are selected when a failure is detected in the data path unit in a safe mode of operation.

7. The semiconductor device according to claim 1, wherein the first intermediate processing circuit uses a first logic circuit group among the plurality of logic circuit groups to perform pre-processing on the input data, and the second intermediate processing circuit at the same time uses a second logic circuit group among the plurality of logic circuit groups to perform the post-processing.

8. A semiconductor device comprising:
a configuration information storage memory that stores a plurality of configuration information items;
a state transition management unit that selects any one of the plurality of configuration information items; and
a data path unit that dynamically reconfigures a circuit according to the configuration information item selected by the state transition management unit, wherein
when a failure is not detected in any one of a plurality of logic circuits provided in the data path unit, the state transition management unit selects the configuration information item so that a first processing circuit is configured using some of the plurality of logic circuits, and
when a failure is detected in any one of the plurality of logic circuit, the state transition management unit selects the configuration information item so that a plurality of the first processing circuits are configured using some or all of the plurality of logical circuits, and
a result of processing by the first processing circuit is determined according to results of processing by the plurality of respective first processing circuits.

9. The semiconductor device according to claim 8, wherein
the number of the plurality of first processing circuits is three or greater, and
the data path unit generates a result of processing of a logical value that accounts for a majority of the results of the processing of the plurality of respective first processing circuits as output data.

10. The semiconductor device according to claim 8, further comprising a majority vote circuit that outputs the result of the processing of the logical value that accounts for a majority of the results of the processing by the plurality of first processing circuits, wherein the number of the plurality of first processing circuits is three or greater.

11. The semiconductor device according to claim 8, wherein an address path is provided between the state transition management unit and the configuration information storage memory, and
wherein a configuration information path is provided between the configuration information storage memory and the data path unit.

12. The semiconductor device according to claim 8, wherein the data path unit comprises a processor that dynamically reconfigures a circuit or plurality of circuits according to the configuration information item supplied from outside of the semiconductor device, and performs processing using a reconfigured circuit on input data, and outputs obtained output data.

13. The semiconductor device according to claim 8, wherein the data path unit activates a process completion signal including switching a level of the process completion signal when the process is completed, and activates a failure detection signal by switching a level of the failure detection signal when a failure is detected.

14. The semiconductor device according to claim 8, wherein the configuration information storage memory stores at least one or a plurality of configuration information items that are selected when a failure is not detected in the data path unit in a normal mode of operation and a plurality of configuration information items that are selected when a failure is detected in the data path unit in a safe mode of operation.

15. The semiconductor device according to claim 8, wherein the first intermediate processing circuit uses a first logic circuit group among the plurality of logic circuit groups to perform the pre-processing on the input data, and the second intermediate processing circuit at the same time uses a second logic circuit group among the plurality of logic circuit groups to perform the post-processing.

16. A control method of a semiconductor device comprising:
selecting any one of a plurality of configuration information items and dynamically reconfiguring a circuit inside a data path unit;
selecting, when a failure is not detected in any one of a plurality of logic circuit groups provided in the data path unit, the configuration information item so that a first processing circuit is configured using some or all of the plurality of logic circuit groups;
selecting, when a failure is detected in any one of the plurality of logic circuit groups, the configuration information item so that a first intermediate processing circuit is configured using some or all of logic circuit groups in which no failure is detected from among the plurality of logic circuit groups, and then a second intermediate processing circuit is configured using some or all of the logic circuit groups in which no failure is detected from among the plurality of logic circuit groups, in order to achieve the first processing circuit.

17. The semiconductor device according to claim 16, wherein when a failure is detected in any one of the plurality of logic circuit groups, the configuration information item is selected so that the second intermediate processing circuit is configured after a process completion signal indicating a completion of processing by the first intermediate processing circuit becomes active.

18. A control method of a semiconductor device comprising:
  selecting any one of a plurality of configuration information items and dynamically reconfiguring a circuit inside a data path unit;
  selecting, when a failure is not detected in any one of a plurality of logic circuits provided in the data path unit, the configuration information item so that a first processing circuit is configured using some of the plurality of logic circuits;
  selecting, when a failure is detected in any one of the plurality of logic circuits, the configuration information item so that a plurality of the first processing circuits are configured using some or all of the plurality of logic circuits; and
  determining a result of processing by the first processing circuit according to results of processing by the plurality of respective first processing circuits.

19. The control method of the semiconductor device according to claim 18, further comprising a step of generating a result of processing of a logical value that accounts for a majority of the results of the processing by the plurality of respective first processing circuits, wherein the number of the plurality of first processing circuits is three or greater.

20. The control method of the semiconductor device according to claim 18, wherein a majority vote circuit that outputs the result of the processing of the logical value that accounts for the majority of the results of the processing by the plurality of respective first processing circuits is further provided.

* * * * *